United States Patent
Kakinami et al.

[19]
[11] Patent Number: 5,892,855
[45] Date of Patent: Apr. 6, 1999

[54] APPARATUS FOR DETECTING AN OBJECT LOCATED AHEAD OF A VEHICLE USING PLURAL CAMERAS WITH DIFFERENT FIELDS OF VIEW

[75] Inventors: Toshiaki Kakinami; Mitsuyoshi Saiki, both of Nagoya; Kunihiko Soshi, Tsukuba; Hisashi Satonaka, Susono, all of Japan

[73] Assignee: Aisin Seiki Kabushiki Kaisha, Kariya, Japan

[21] Appl. No.: 720,031

[22] Filed: Sep. 27, 1996

[30] Foreign Application Priority Data

Sep. 29, 1995 [JP] Japan .................................. 7-252222

[51] Int. Cl.⁶ ..................................................... G06K 9/36
[52] U.S. Cl. .......................... 382/291; 382/103; 382/104; 348/119; 348/149
[58] Field of Search ...................................... 382/103, 104, 382/106; 340/907, 903, 937; 348/148, 149, 113, 118, 143, 211, 119

[56] References Cited

U.S. PATENT DOCUMENTS

| | | | |
|---|---|---|---|
| 5,172,317 | 12/1992 | Asanuma et al. | 364/424.02 |
| 5,424,952 | 6/1995 | Asayama | 364/443 |
| 5,461,357 | 10/1995 | Yoshioka et al. | 340/435 |
| 5,487,116 | 1/1996 | Nakano et al. | 382/104 |
| 5,555,312 | 9/1996 | Shima et al. | 382/104 |
| 5,555,555 | 9/1996 | Sato et al. | 382/104 |
| 5,617,085 | 4/1997 | Tsutsumi et al. | 340/903 |

FOREIGN PATENT DOCUMENTS

| | | |
|---|---|---|
| 0 354 561 | 2/1989 | European Pat. Off. |
| 64-15605 | 1/1989 | Japan |
| 1-276214 | 11/1989 | Japan |
| 6-124345 | 5/1994 | Japan |

OTHER PUBLICATIONS

Proceedings of the Intelligent Vehicles '94 Symposium, Oct. 24–26, 1994, "VITA II –Active Collision Avoidance in Real Traffic", Berthold Ulmer, pp. 1–6.

Daimler–Benz High Tech Report Apr. 1994, "A Visonary Tool in the Battle to Prevent Accidents", pp. 11–12.

*Primary Examiner*—Christopher S. Kelly
*Assistant Examiner*—Sheela Chawan
*Attorney, Agent, or Firm*—Burns, Doane, Swecker & Mathis, LLP

[57] ABSTRACT

An onboard forward monitoring system is disclosed in which three television cameras, each supported by a steering mechanism, take picture of a road surface located forward of a vehicle at near distance, a medium distance and a far distance zone to detect white lines which partition a lane on the road surface, thus detecting a vehicle running ahead on the lane which is defined by the white lines. To enable a reliable detection and tracking of the vehicle running ahead in any zone of the road surface even when the road is curved, the individual television cameras are steered so that a vehicle running ahead is positioned at the center of the screen whenever such vehicle is present and so that a center across the width of the lane is positioned at the center of screen when a vehicle running ahead is not detected.

13 Claims, 20 Drawing Sheets

ORIGIN OF POLAR COORDINATES

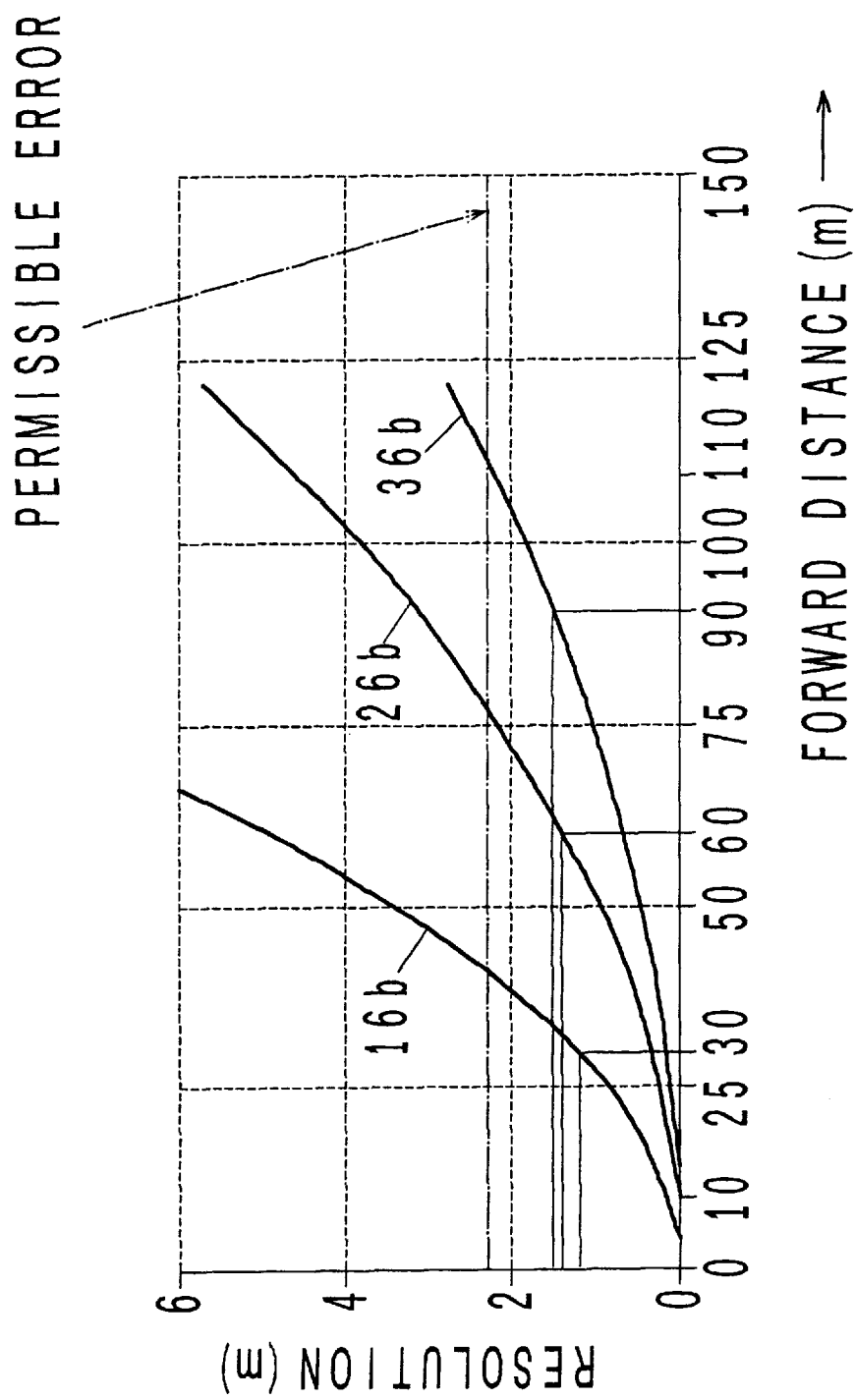

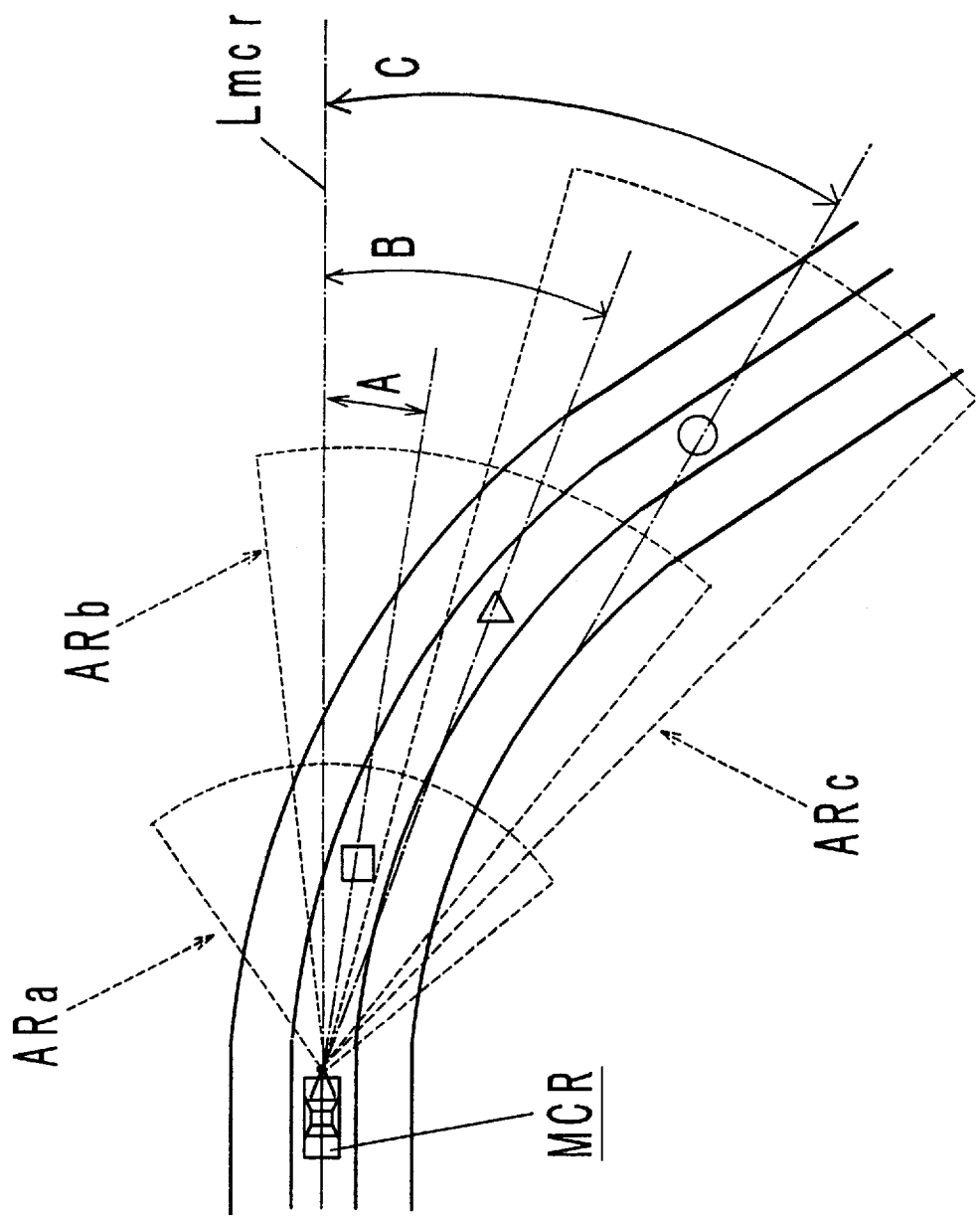

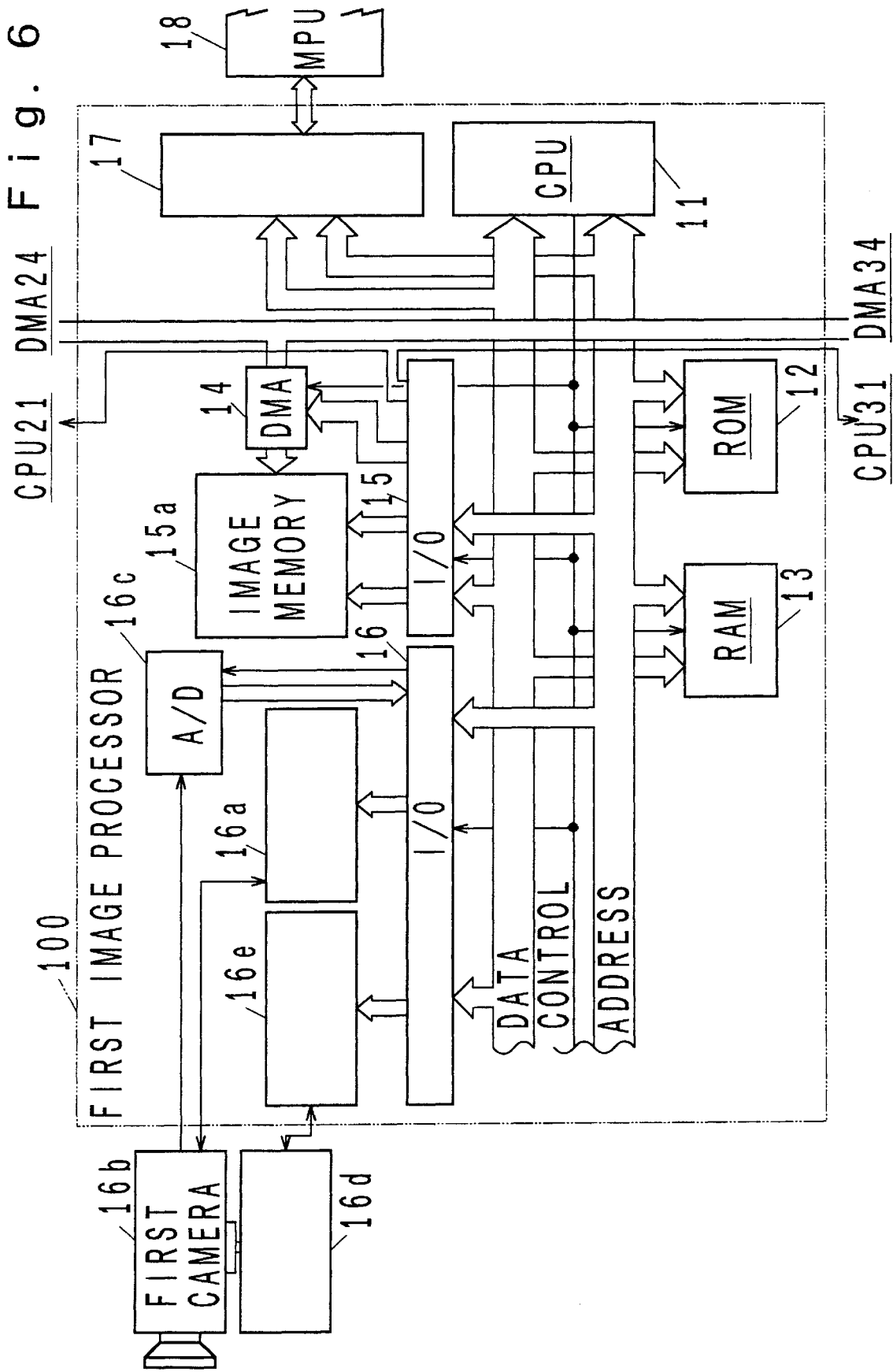

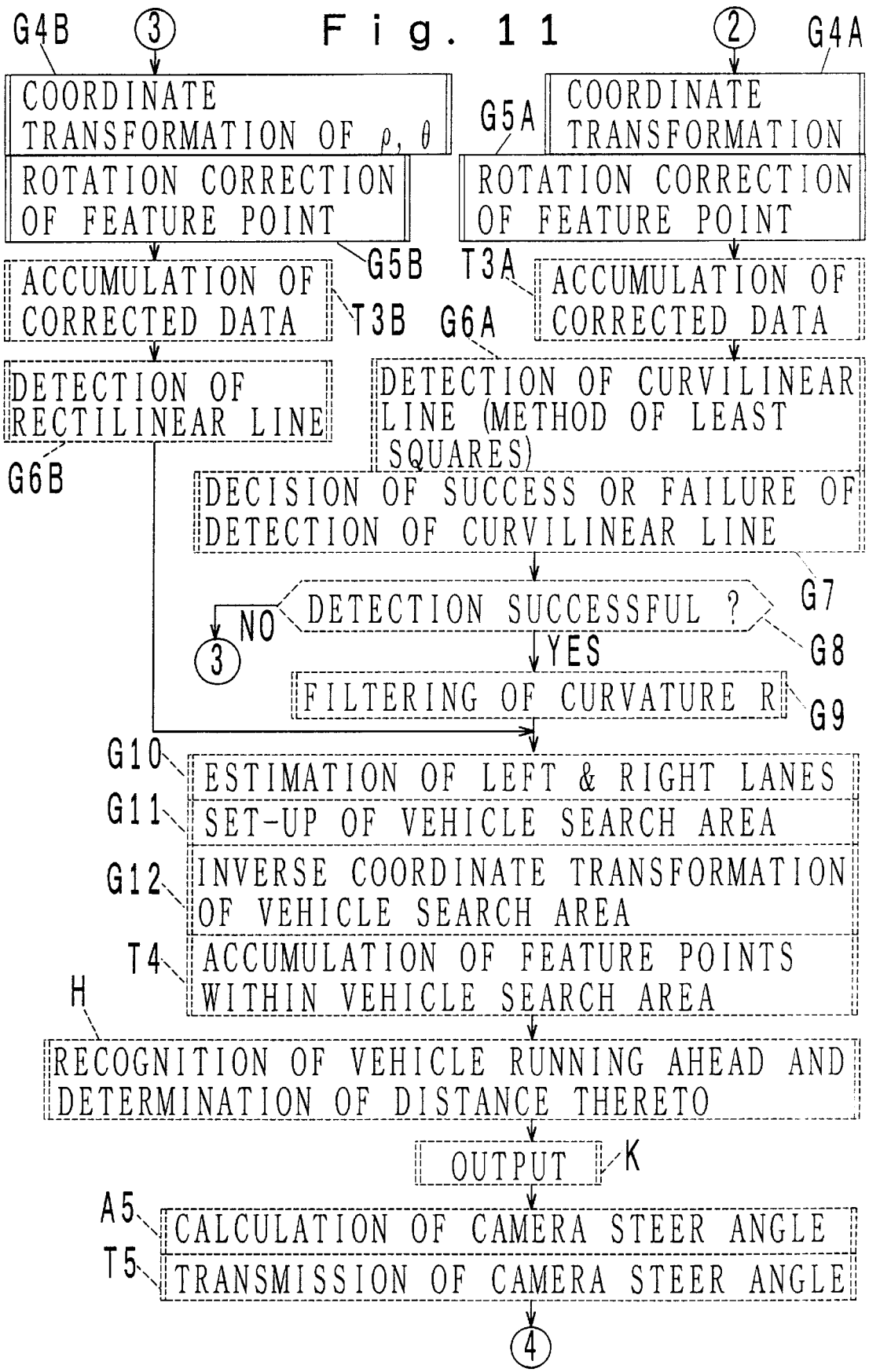

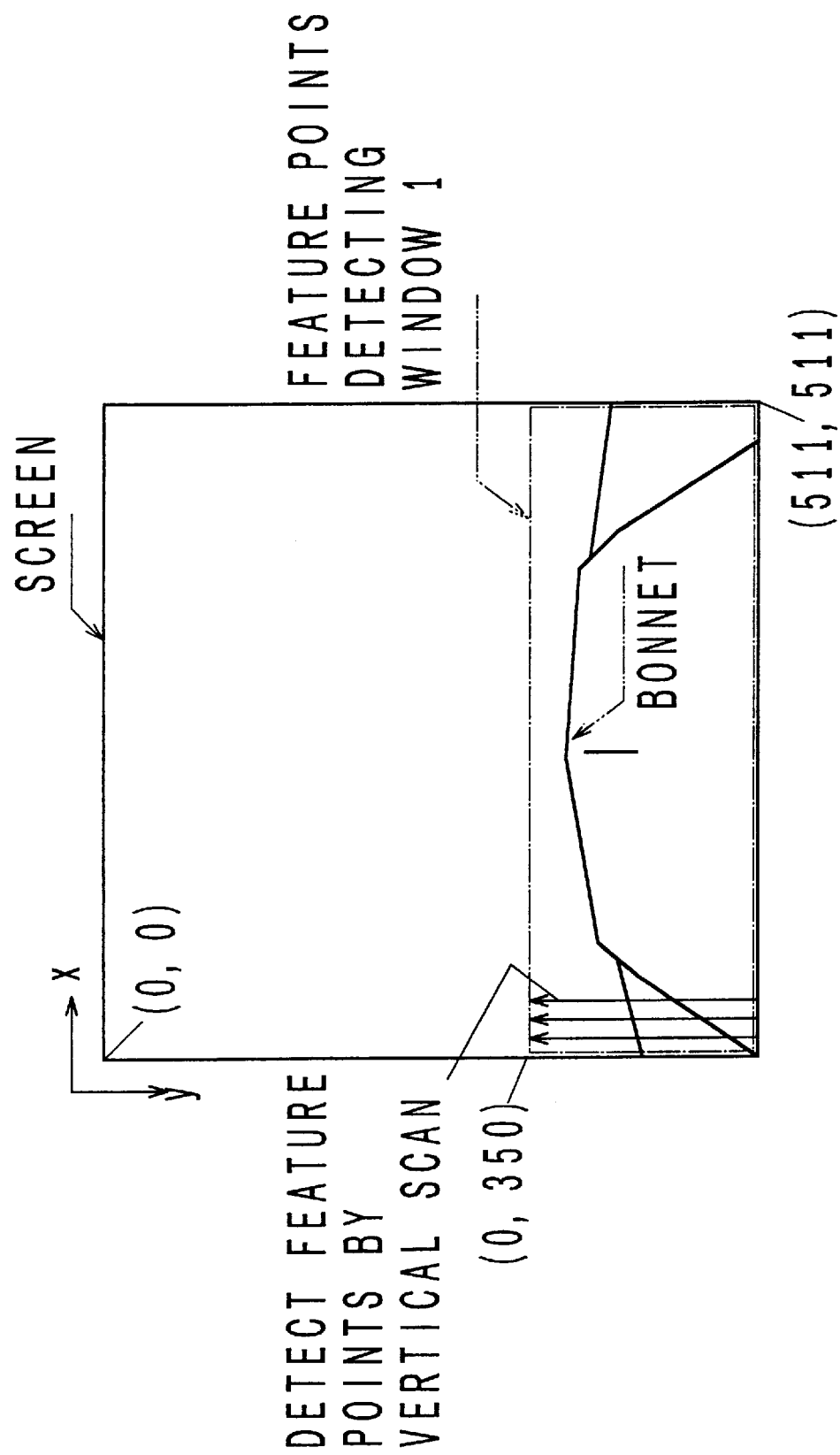

e: POINT OF INTEREST

Fig. 16

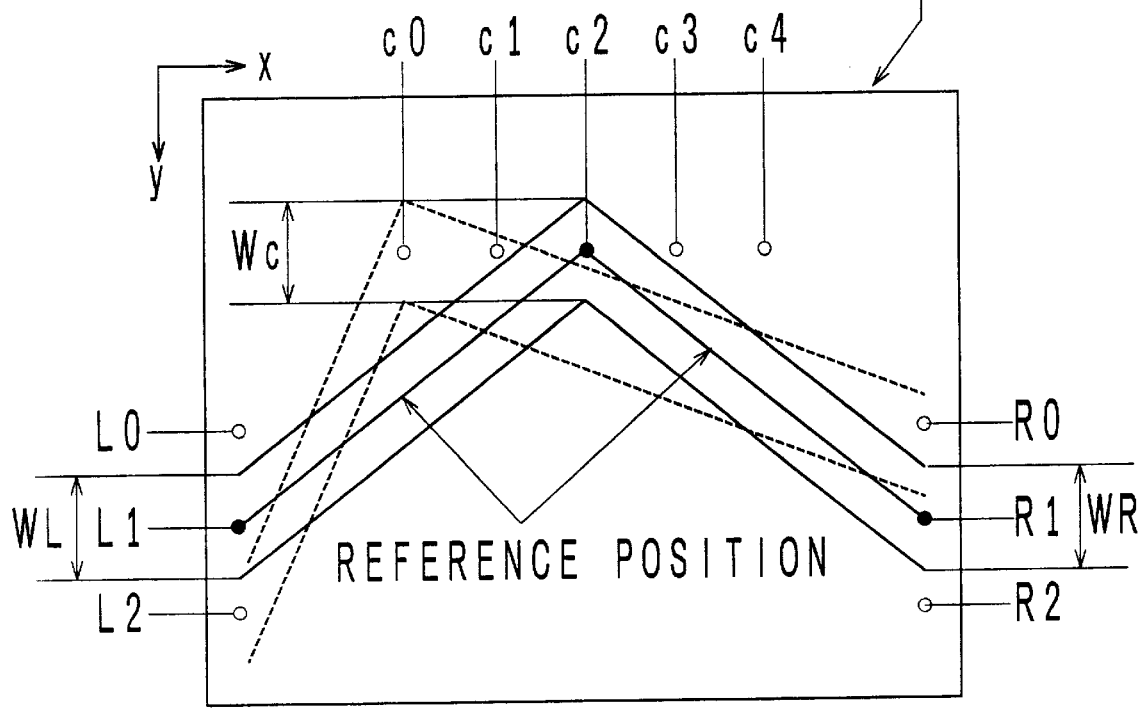

FEATURE POINTS DETECTING WINDOW c0~c4 : HORIZONTAL COORDINATE OF WINDOW APEX

L0~L2 : VERTICAL COORDINATE OF WINDOW LEFT END

R0~R2 : VERTICAL COORDINATE OF WINDOW RIGHT END

Wc : VERTICAL SIZE OF WINDOW AT APEX

WL, WR : VERTICAL SIZE OF WINDOW AT LEFT AND RIGHT ENDS

——— : WINDOW CONFIGURATION DEFINED BY APEX C2, LEFT END L1 AND RIGHT END R1

------- : WINDOW CONFIGURATION DEFINED BY APEX C0, LEFT END L2 AND RIGHT END R0

APPARATUS FOR DETECTING AN OBJECT LOCATED AHEAD OF A VEHICLE USING PLURAL CAMERAS WITH DIFFERENT FIELDS OF VIEW

FIELD OF THE INVENTION

The invention relates to the detection of an object located ahead of a vehicle, and while not intended to be limited thereto, in particular to an on-road object detecting apparatus in which a scene located ahead of a vehicle, including a road surface, is photographed on the vehicle and in which on a picture screen, white lines partitioning a lane or lanes on the road surface, any vehicle running ahead and any obstacle located ahead is detected and in which a distance from an own vehicle to the detected vehicle which runs ahead is calculated.

BACKGROUND OF THE INVENTION

An example of such detecting apparatus is disclosed in Japanese Laid-Open Patent Application No. 15,605/89 wherein a television camera onboard a vehicle takes a picture of a scene, including a road surface, located ahead of the vehicle, and image data from the camera is displayed on a picture screen defined in x-y orthogonal coordinate system. A derivative of the image data in a direction which forms an angle of 45° with respect to the x-axis is calculated, and locations defined in terms of x- and y- orthogonal coordinates where the derivative exceeds a given value are selected as feature points. A succession of feature points are converted into a thin line, and a thin line or lines having a length which exceeds a given value are picked out. A thin line which satisfies a certain condition determined on the basis of features which are exhibited by a white line on the screen when it is photographed by a television camera onboard the vehicle is recognized as a white line on the road surface. In this manner, a pair of rectilinear lines which represents the white lines defining the left and the right end of a lane on which an own vehicle is running are obtained. A point of intersection between the pair of rectilinear lines is determined, and the presence or absence of an object in a triangular region defined by the pair of rectilinear lines extending between the point of intersection and the own vehicle is detected. When an object is detected, a distance from the own vehicle to such object or vehicle-to-vehicle distance if the object is a vehicle running ahead is calculated.

When the lane on which the own vehicle is running extends straightforward, any vehicle running ahead of the own vehicle on the lane exists in the triangular region. If a roof of such vehicle is displaced out of sight, the base of the vehicle lies within the region. It is to be noted that the pair of rectilinear lines which approximate the white lines on the left and the right end are determined on the basis of an image of these white lines at a location close to the camera. Accordingly, when the lane on which the own vehicle is running is curved near the own vehicle or at a point located forward of the own vehicle, the point of intersection between the pair of rectilinear lines, which can be viewed as a point of infinity for a straight lane, will be displaced to the left of a far point on this lane if the lane is curved to the right, or displaced to the right of the far point if the lane is curved to the left. Accordingly, where the road is curved, the probability that the detection of an object located ahead such as a vehicle running ahead or an obstacle located ahead, in particular, an object located far ahead fails will be high when relying upon only the search for any object in the triangular region.

Japanese Laid-Open Patent Application No. 276,214/89 proposes an automatic vehicle driving scheme in which a picture of an index along the roadside is taken by a camera onboard a vehicle to produce vehicle position information, which is compared against destination information to determine an optimum route, thus controlling a vehicle speed and a wheel steering in accordance with the route thus determined. It also proposes a two dimensional attitude changing mechanism for the camera for changing the direction, in which the camera takes a picture of the index along the roadside, in both horizontal and vertical directions. However, it will be noted that this proposal premises that the road actually exists in accordance with the optimum route determined and that there is no vehicle which is running ahead of the own vehicle on that road. In actuality, a recognition of the fact that such a road exists in fact and the reliable detection of the presence or absence of any vehicle running ahead as well as vehicle-to-vehicle distance therebetween are required.

Japanese Laid-Open Patent Application No. 124,345/94 proposes a tracking system which allows a camera to track a vehicle running ahead, by controlling the focal length and zooming so that an image of the vehicle running ahead occupies a substantially constant size on the screen, and by controlling the attitude of the camera in other horizontal and vertical directions such that the image of the vehicle running ahead is located substantially at the center of the screen. While such tracking control must premise a detection and/or identification of an initial vehicle which is running ahead, and also a search for a next succeeding vehicle when the initial vehicle running ahead which has been being tracked takes a different course and disappears from the sight forward of the own vehicle, but there is no corresponding teaching. In addition, there is no teaching about the method to deal with an erroneous tracking which may result when the vehicle being tracked takes a different course and deviates from the direction in which the own vehicle is traveling.

A pending U.S. patent application Ser. No. 08/183,369, filed by Jun SATO et al, entitled "METHOD OF DETECTING LINES APPROXIMATING AN IMAGE" corresponding to Japanese Laid-Open Patent Application No. 213,660/94 discloses an apparatus for detecting a vehicle located ahead of an own vehicle in which a camera onboard a vehicle derives an image of a road surface ahead of an own vehicle and displayed on a screen which is defined in x-y orthogonal coordinate system. A rectilinear line appearing on the screen is detected by Hough transformation, and on the basis of the line detected, a distribution on the screen of the lane on which an own vehicle is running is calculated. Subsequently, any vehicle running ahead or an obstacle located ahead on this lane is searched, and a distance to the vehicle which is found by such search is calculated.

The detection of a lane and a vehicle thereon which runs ahead of an own vehicle must cover a long distance for the search because the own vehicle is running. For example, an automatic vehicle-to-vehicle distance control may be conducted in which a vehicle running ahead is detected, a distance from the own vehicle to the detected vehicle is calculated, and a calculated distance is compared against a target distance which is established in accordance with a running speed of the own vehicle, and the own vehicle is decelerated if the detected distance is less than the target distance or the own vehicle is accelerated if the detected distance is greater than the target distance. In such instance, as a simplified example, when the own vehicle is running at a speed on the order of 40 km per hour, it may be tentatively assumed that the safety is assured if the search covers 30 m ahead. However, when the own vehicle is running at a speed on the order of 80 km, it may become necessary to detect any vehicle running ahead over a section of an increased length of 50 m or longer. In any event, because the vehicle runs at a speed over an extensive range, it is preferred that the automatic detection of any vehicle running ahead may cover a long section of 50 m or longer, assuming a high speed running.

However, it will be seen that at short distances, it is preferable to detect a vehicle with a wider angle in order to provide against lateral approach of a neighboring vehicle or to provide for a lane change, and thus it is preferred to use a camera having a wide view angle. However, this degrades the resolution for an object located at a far distance, and hence the accuracy of detection. When a narrow field of view or telescoping capability is chosen for detecting of an object located at a far distance, objects located at a near distance, in particular, a neighboring lane, will be left out, preventing a vehicle which is running on a neighboring lane from being detected. In addition, where the road is curved, a region located beyond the curvature will be removed from the screen, thus preventing a recognition of a vehicle there located.

Accordingly, while it is relatively simple to provide a tracking control of a target which is reliably identified as a vehicle running ahead on a lane on which an own vehicle is running, it is difficult to provide an extended coverage from an area located immediately in front of an own vehicle to a point far ahead which is prerequisite to such tracking control, namely, the detection of a road condition (whether it is curved or straightforward), the detection of the presence or absence of any vehicle running ahead or an obstacle located ahead, and a decision whether the detected vehicle or object is located on the lane on which the own vehicle is running. It is desirable to provide such a detection and decision technique with a high accuracy.

SUMMERY OF THE INVENTION

It is a first object of the invention to detect an object located ahead of a road, in particular, ahead of a curved road as early as possible, that is to say, while it is located at a far point, and it is a second object of the invention to improve the accuracy of such detection.

In accordance with the invention, camera means is employed for taking a picture of a first scene of wide view angle defined by a first angle A transverse to the fore-and-aft axis of the vehicle and located ahead of an own vehicle, inclusive a road surface at a near distance, and a second scene of narrow view angle defined by a second angle B transverse to the fore-and-aft axis of the vehicle and located ahead, including a road surface at a far distance. An image processor provides a picture screen of the first and second scene on the basis of image data, and detects an object on a road surface in either the first or the second scene such as white line, a vehicle running ahead or an obstacle located ahead. A camera direction controller alters the first angle A in a direction such that a substantially full profile of the object located on the first scene is contained in the first scene, and also alters the second angle B in a direction such that a substantially full profile of the object detected on the second scene is contained in the second scene.

The first scene covers an extensive area forward of the own vehicle and which extends laterally therefrom at a near distance. Accordingly, the first scene contains a portion of the lane on which the own vehicle runs and which is located at a near distance, for example, at a distance from 10 to 30 m, and any vehicle running ahead on that lane, and any other vehicle on adjacent lane or lanes which are located slightly forward of the own vehicle. The resolution of these objects on the screen displaying the first scene is high. Consequently, a lane on which an own vehicle runs, any vehicle running ahead and any lateral vehicle (running on an adjacent lane) can be reliably detected on the basis of image data representing the first scene.

On the other hand, the second scene covers a far distance, for example, from 30 to 60 m, ahead of the vehicle with a narrow view angle, and thus present a high resolution for the road surface and a vehicle located at a far distance on the screen of the second scene. Accordingly, a road surface and a vehicle located at a far distance can be detected with a high accuracy on the basis of image data which produce the second scene on the screen.

Because the camera means takes a picture of the first and the second scene, and the image processor detects an object or objects located on the road surface in the first and second scene on the basis of image data which produce the first and second scene, a lane on which an own vehicle runs, any vehicle running ahead and any lateral vehicle located at the near distance forward of the own vehicle can be reliably detected while a road surface and any vehicle located at a far distance forward of the own vehicle can be detected with high accuracy.

If the direction in which the camera means is directed relative to the fore-and-aft axis of the vehicle is fixed, there is a high likelihood that a road surface and any vehicle located at a far distance may go out of the first and second scene in the event the road is curved. However, the camera direction controller alters the first angle A in a direction such that a substantially full profile of any object detected on the first scene is contained in the first scene, and also alters the second angle B in a direction such that a substantially full profile of an object detected on the second scene is contained in the second scene. As a result, if the road is curved, the first and second scene are both capable of containing any on-road object, thus permitting the detection of a road surface and any vehicle which is located a relatively far distance and beyond the point of curvature and enhancing the reliability of detection of a road surface and any vehicle which is located at a near distance and/or far distance forwardly of the own vehicle, by the image processor.

In a preferred embodiment of the invention, the camera direction controller determines the first angle A such that the substantial center of an object detected on the first scene and located forward of the own vehicle defines the center of the first scene, and also determines the second angle B such that the substantial center of an object detected on the second scene and which is located forward of the own vehicle defines the center of the second scene. In this manner, any object detected and located ahead of the own vehicle is positioned at the center of the screen on which the first and the second scene are displayed, thus presenting a high accuracy in detecting any object.

In the preferred embodiment of the invention, the image processor applies Hough transformation to image data which creates the first and second scene on the screen to detect a white line which partitions a lane on which the own vehicle is running. On the basis of white lines detected, a vehicle search region is defined on the first and the second scene. Any vehicle which is located forward of the own vehicle and which is contained in these scenes are detected, and a distance or distances to these vehicles from the own vehicle are calculated. The camera direction controller determines the first angle A and the second angle B so that the centerline of the lane on which the own vehicle is running coincides with the centerline of the first and second scene. In this manner, the camera direction controller tracks the lane on which the own vehicle is running. This enhances the accuracy of detecting the lane on which the own vehicle is running, also improving the accuracy of the determining whether or not a vehicle detected forward of the own vehicle lies on the lane on which the own vehicle is running.

In the preferred embodiment of the invention, the camera means includes a first television camera of a wide view angle which takes a picture of a road surface located at a near distance from 10 to 30 m forward of an own vehicle, a first rotary drive unit for rotatively driving the camera in order to alter a camera direction A of the first television camera transverse to the fore-and-aft axis of the vehicle, a second television camera of medium view angle taking a picture of a road surface located at a medium distance from 30 to 60 m forward of the own vehicle, a second rotary drive unit for rotatively driving the second camera in order to alter the camera direction B of the second television camera transverse to the fore-and-aft axis of the vehicle, a third television camera of narrow view angle taking a picture of a road surface at a far distance from 60 to 90 m forward of the own vehicle, and a third rotary drive unit for rotatively driving the third camera in order to alter the camera direction of the third television camera transverse to the fore-and-aft axis of the vehicle. On the basis of image data from the respective television cameras which are used to create a first, a second and a third scene on a picture screen, the image processor detects an object located on the road surface of each scene such as a white line, a vehicle running ahead or an obstacle located ahead. The camera direction controller alters the first angle A in a direction such that a substantially full profile of an object detected on the first scene and which is located forward of the own vehicle is contained in the first scene, alters the second angle B in a direction such that a substantially full profile of an object detected on the second scene and which is located forward of the own vehicle is contained in the second scene, and also alters the third angle C in a direction such that a substantially full profile of an object detected on the third scene and which is located forward of the own vehicle is contained in the third scene. In this manner, a white line, any vehicle running ahead or any obstacle which is located on the road in the range from 10 to 90 m forward of the own vehicle can be detected with a high accuracy.

Other objects and features of the invention will become apparent from the following description of a preferred embodiment with reference to the drawings.

BRIEF DESCRIPTION OF THE DRAWINGS

FIG. 1b is a side elevation of a driver's seat on a vehicle, also illustrating the disposition of television cameras 16b, 26b and 36b shown in FIG. 1a;

FIG. 2 is a plan view of a picture screen indicating a scene taken by the television camera 16b shown FIG. 1a;

FIG. 4b graphically illustrates a resolution of the television cameras 16b, 26b and 36b shown in FIG. 1a, indicating the length of an object being taken per picture element of the photoelectric conversion unit, or resolution σ;

FIG. 5 is a plan view indicating the coverages ARa, ARb and ARc of the television cameras 16b, 26b and 36b shown in FIG. 1a and their steering angles A, B and C;

FIG. 6 is a block diagram of a first image processor 100 shown in FIG. 1a;

FIG. 7 is a block diagram of a second image processor 200 shown in FIG. 1a;

FIG. 8 is a block diagram of a third image processor 300 shown in FIG. 1a;

FIG. 11 is a flow chart continuing from FIG. 10 and illustrating the remainder of the operation performed by CPU 11 shown in FIG. 6;

FIG. 12b is a plan view indicating a region on the picture screen produced by the television camera 16b shown in FIG. 1a which corresponds to the feature points detecting window 1;

FIG. 13b is a plan view, showing the distribution of feature points on the picture screen produced by the television camera 16b shown in FIG. 1a and rectilinear lines which are detected by "line fitting" 13R shown in FIG. 13a;

FIG. 14 is a plan view indicating a roll angle and a pan travel on the picture screen produced by the television camera 16b shown in FIG. 1a;

FIG. 16 is a plan view indicating a lane detecting window on the picture screen produced by the television camera 16b, which is set up at "set-up of lane detecting window" A3 shown in FIG. 10;

DESCRIPTION OF PREFERRED EMBODIMENT

Figure 1A:
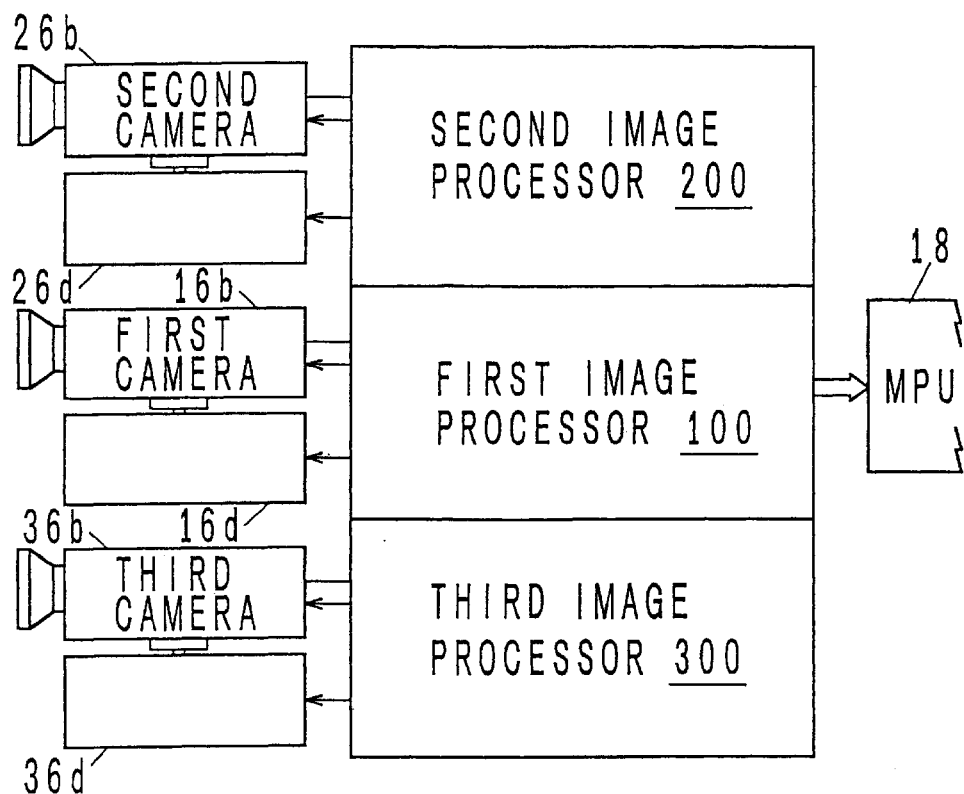
FIG. 1a is a block diagram illustrating a general arrangement of a preferred embodiment of the invention.

Referring to FIG. 1a which shows one embodiment of the invention, a first, a second and a third television camera 16b, 26b and 36b are supported by respective rotary mechanisms 16d, 26d and 36d, respectively, and are connected to a first, a second and a third image processor 100, 200 and 300, respectively. Each of the rotary mechanisms 16d, 26d and 36d internally houses an electrical motor for rotary drive and a reduction gearing having an output rotating shaft on which the camera 16b, 26b or 36b is fixedly mounted.

Figure 1B:
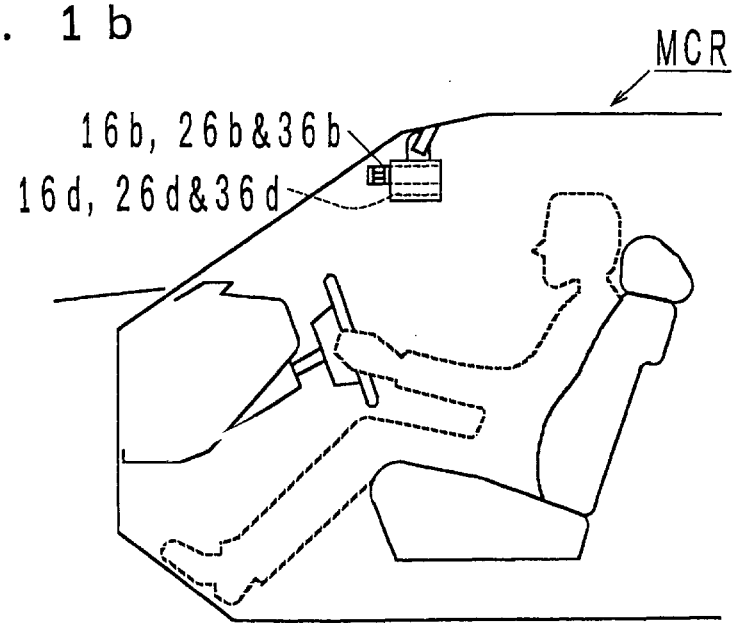

All of the first to the third rotary mechanisms 16d to 36d are supported by a single support frame, and are located adjacent to the top center of a front window within the compartment of a vehicle MCR, as shown in FIG. 1b. Each of the first to the third television camera 16b to 36b delivers a video signal or analog picture signal comprising 512×512 picture elements per frame by taking a picture of scene located forward of an own vehicle.

Figure 2:
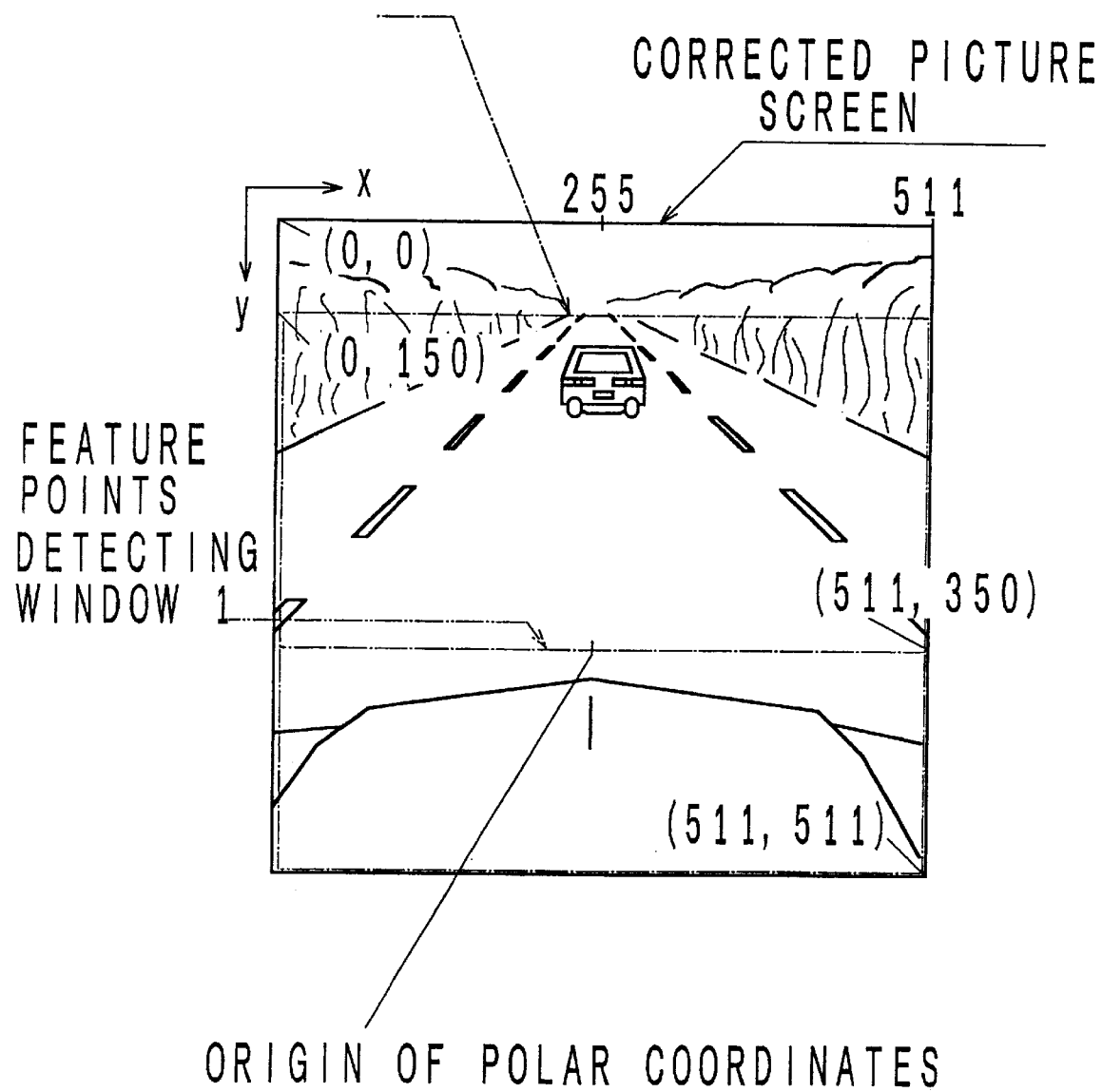

The first camera 16b is a wide view angle camera, and projects an area measuring about 24 m×24 m located up to 30 m forward of an own vehicle and extending in a direction perpendicular to the centerline of the field of view onto 512×512 picture elements disposed in an array along x and y coordinates. When the road is horizontal, the centerline of the field of view intersect with the road surface at a distance of about 15 m forward of the own vehicle. The first camera 16b is focused to this point of intersection. A picture screen produced by the first camera 16b is illustrated in FIG. 2. As an example, assuming that the road surface is horizontal, a road surface at located y=150 on the screen corresponds to a distance of 30 m forward of the own vehicle, and a road surface located at y=350 corresponds to a distance of 10 m forward of the own vehicle. The detection of a white line and vehicle, which will be described later, takes place in a range from y=150 to y=350 (which is feature points detecting window 2).

The second camera 26b represents a camera having a standard view angle, and projects an area measuring about 19 m×19 m, located up to 60 m forward of the own vehicle and extending in a direction orthogonal to the centerline of the field of view, onto 512×512 picture elements disposed in an array along x and y coordinates. The centerline of the field of view intersects with a road surface at about 45 m forward of the own vehicle when the road surface is horizontal. The second camera 26b is focused to this point of intersection. On the picture screen produced by the second camera 26b, a road surface located at y=150 is at a distance of 60 m forward of the own vehicle, and a road surface located at y=350 is at a distance of 30 m forward of the own vehicle. The detection of a white line and vehicle, which will be described later, takes place in a range from y=150 to y=350 (feature points detecting window 2).

The third camera 36b is a telescopic camera, and projects an area measuring about 13 m×13 m and located up to 90 m forward of the own vehicle and extending in a direction orthogonal to the centerline of the field of view onto 512×512 picture elements disposed in an array along the x and y coordinates. When the road surface is horizontal, the centerline of the field of view intersects with a road surface at about 75 m forward of the own vehicle. The third camera 36b is focused to this point of intersection. On the picture screen produced by the third camera 36b, a road surface located at y=150 is at a distance of 90 m forward of the own vehicle, and a road sur face located at y=350 is at a distance of 60 m forward of the own vehicle. The detection of a white line and a vehicle, which will be described later, takes place in a range from y=150 to y=350 (feature points detecting window 2).

Figure 3:
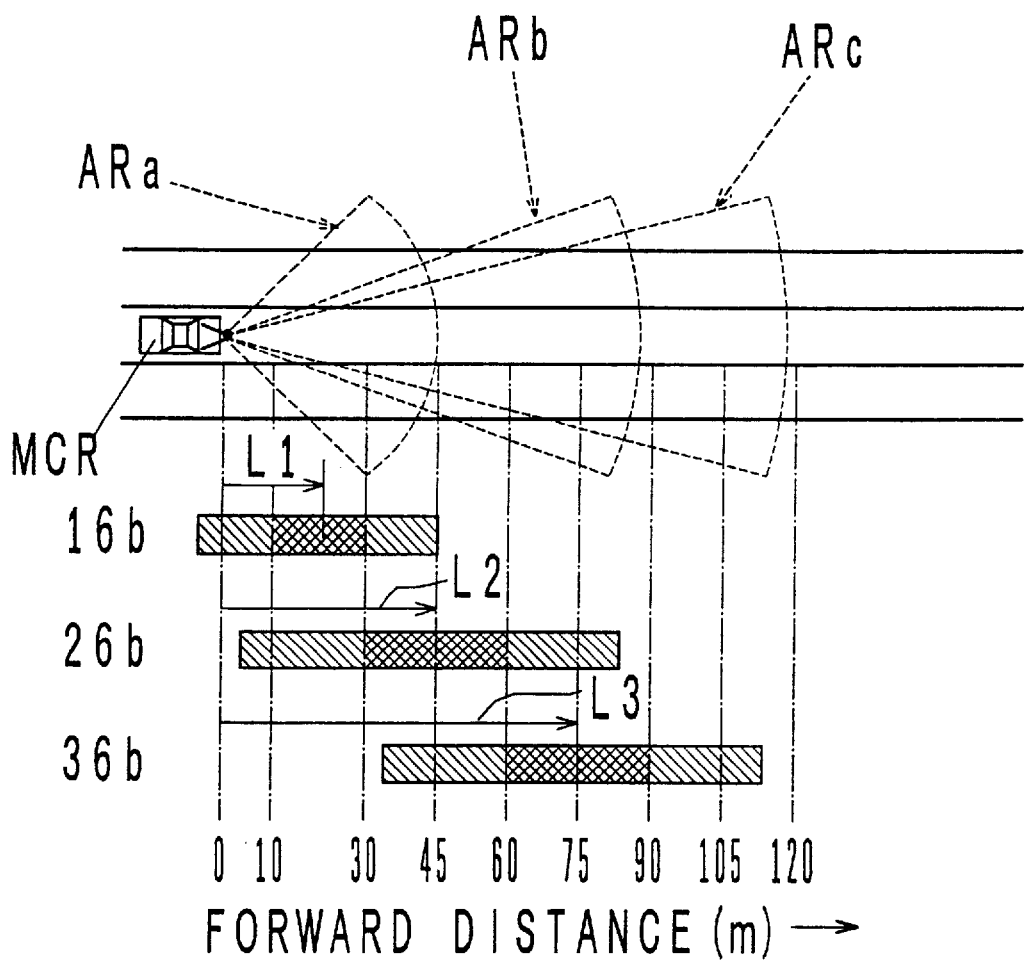
FIG. 3 is a plan view illustrating coverages ARa, ARb and ARc of the television cameras 16b, 26b and 36b shown in FIG. 1a, in the direction forward of an own vehicle.
Figure 4A:
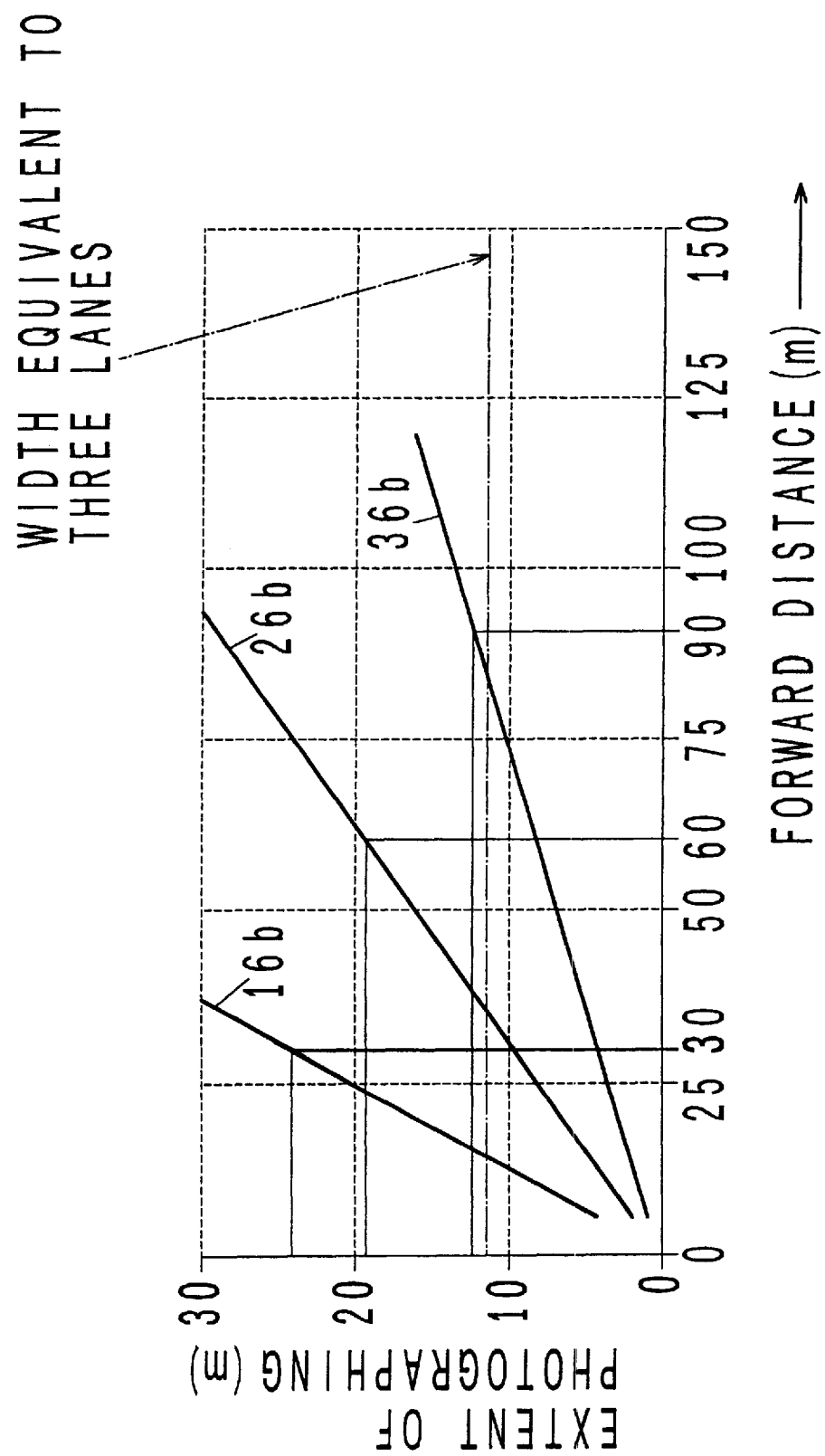
FIG. 4a graphically illustrates the lateral coverage or breadth of the television cameras 16b, 26b and 36b shown in FIG. 1a, as viewed forward from an own vehicle.

FIG. 3 shows a coverage (the entire screen) of each of the cameras 16b, 26b and 36b in relation to the distance measured forward of the own vehicle, and a region where the detection of a white line and a vehicle takes place (corresponding to y=150 to y=350: the region corresponding to the feature points detecting window 2). FIG. 4a indicates the breadth or lateral coverage of the respective cameras in relation to the distance measured forward from the own vehicle, and FIG. 4b indicates the relationship between the resolution σ and the distance measured forward from the own vehicle. The resolution σ represents a minimum distance which can be determined at a particular distance forward of the own vehicle, and the accuracy in which the distance can be determined is improved as the field of view of the camera becomes narrower.

When the road is curved, if a camera having a narrow angle of view is used, the possibility that the camera may take a picture in a direction away from the road surface increases. Accordingly, in the present embodiment, the rotary mechanisms 16d, 26d and 36d are used to support the cameras 16b, 26b and 36b, respectively, and principally using CPU 11, to be described later, of the image processor 100, a lane and any vehicle running ahead which lie in a range of distance from 10 m to 90 m forward of the own vehicle is detected. When a vehicle running ahead is not detected, the cameras 16b, 26b and 36b are individually steered so that the center of the field of view of each of the cameras be brought into alignment with a center of the lane, as shown in FIG. 5. A camera which has detected the presence of a vehicle within the field of view (corresponding to a range from y=150 to y=350) is steered to place the detected vehicle at the center of the field of view. A square mark, a triangle mark and a circle mark within the coverages ARa, ARb and ARc of the cameras 16b, 26b and 36b, respectively, shown in FIG. 5, indicate the positions on the centerline of the field of view where an image having the greatest sharpness is obtained. Characters A, B and C represent steer angles of the cameras 16b, 26b and 36b, which represent in each instance an angle formed between the projection of the fore-and-aft axis Lmcr of the vehicle onto the horizontal plane and the projection of the centerline of the field of view of each camera onto the horizontal plane.

FIG. 6 shows the arrangement of the first image processor 100. The image processor 100 essentially comprises a microcomputer (here-after referred to as CPU 11) including buses, to which a read only memory (ROM) 12 having a control program stored therein, a read-write memory (RAM) 13 having parameters being processed stored therein, and input/output ports (I/O) 15, 16 are connected. Various components are additionally connected to these input/output ports. An analog picture signal delivered by the first camera 16b is applied to an A/D converter 16c. The converter 16c converts the analog picture signal from the first camera 16b into digital data or gradation data having a number of digits capable of representing 256 gradations (gradation 0 representing a black level and gradation 255 representing a white level) for each picture element, and feeds such data to an image memory 15a. It is to be noted that the image memory 15a includes a gradation data storage area for storing several pages and a binary data storage area capable of storing a bit information or binary data, representing whether a particular picture element represents a black or a white, where one page is defined as an area for storing gradation data or binary data for one screen (512×512 picture elements).

CPU 11 controls the diaphragm and the output level of the analog picture signal from the first camera 16b through a television camera controller 16a, and also synchronously controls the input/output to or from the A/D converter 16c and the write-in into the image memory 15a. The image memory 15a is connected to a DMA unit 14, into which image data delivered from the image processor 200 or 300 is written into at a memory area specified by CPU 11.

The rotary mechanism 16d includes an electrical motor, not shown, which is connected to a motor driver, not shown, contained in a steering controller 16e. CPU 11 delivers a target angle to the controller 16e, which drives the electric motor of the rotary mechanism 16d for rotation in either the forward (in the right-hand) direction or in the reverse (in the left-hand) direction so that the steer angle A established for the first camera 16b by the rotary mechanism 16d assumes a target value An. The motor ceases to operate when the steer angle A of the first camera 16b coincides with the target angle An. It is to be noted that the steer angle A is an angle formed between the centerline of the field of view of the camera (or its projection onto the horizontal plane) and the fore-and-aft axis of the vehicle (or its projection onto the horizontal plane), and is equal to 0 when the both coincide. In the present embodiment, a steering range in which the angle A is adjusted is from +60° (in the right-hand direction) to −60° (in the left-hand direction).

Figure 7:
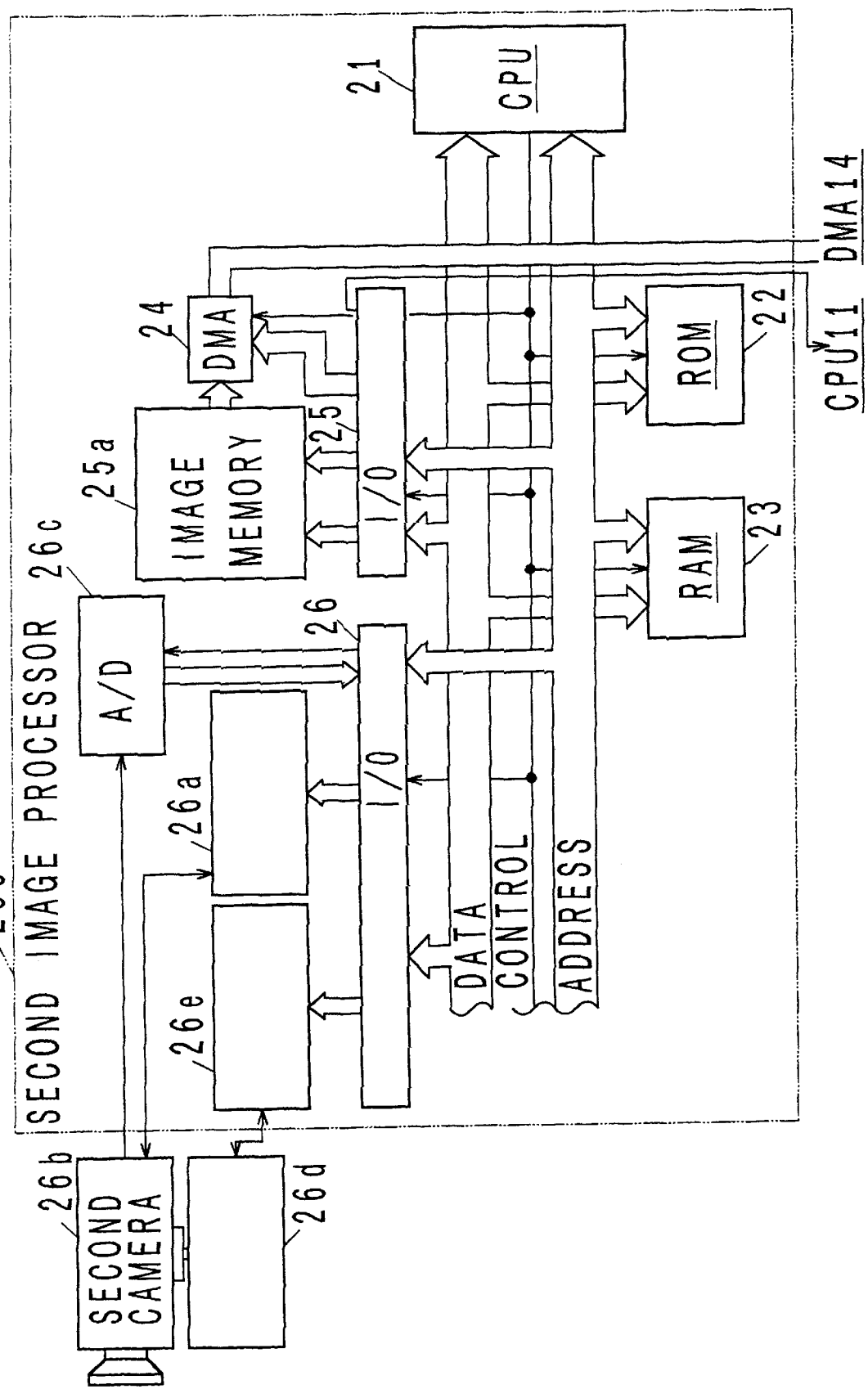
Figure 8:
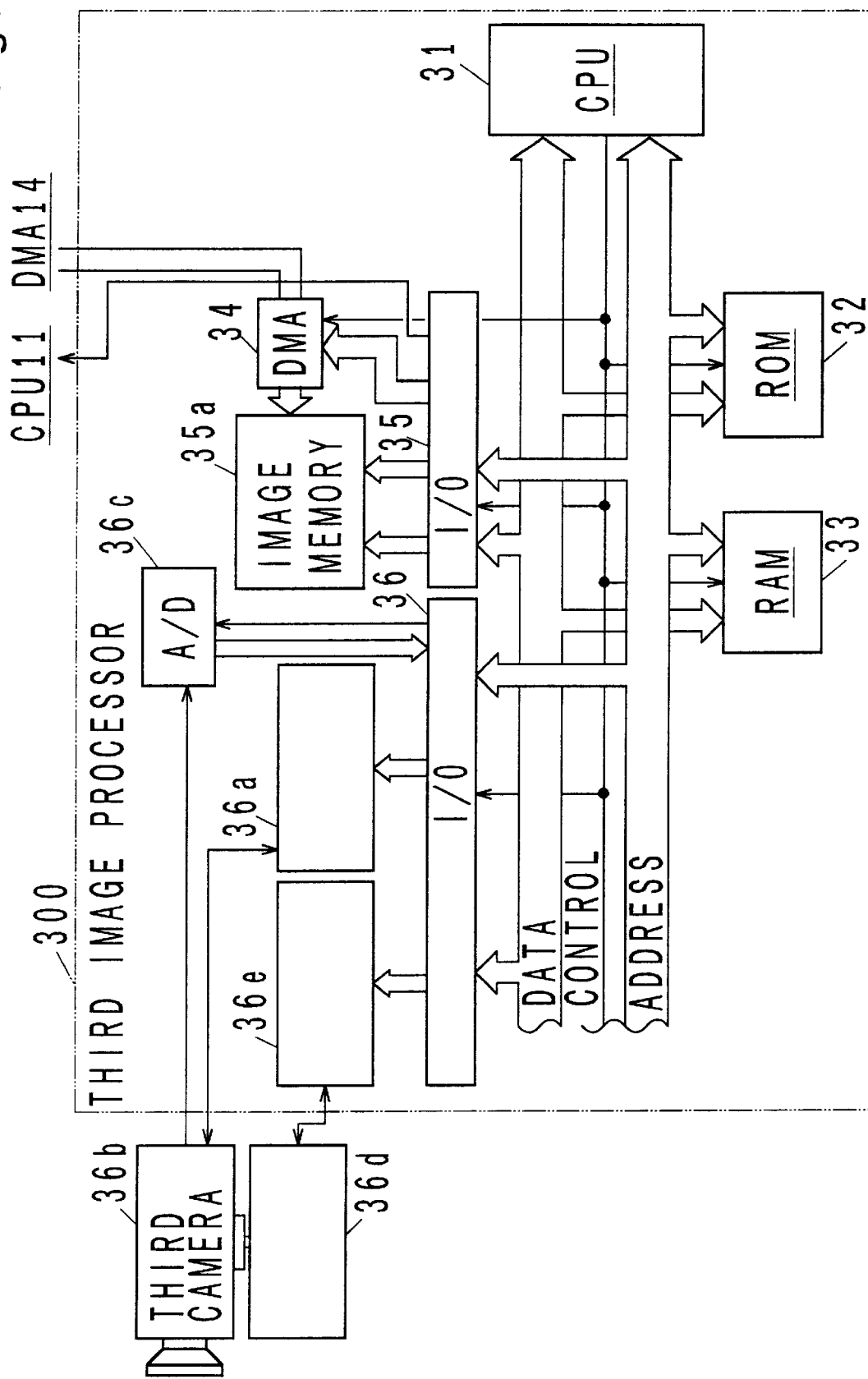

FIGS. 7 and 8 show the arrangement of the second image processor 200 and the third image processor 300, respectively. It will be noted that the arrangement of the image processors 200, 300 is similar to the arrangement of the first image processor 100. However, it is to be noted that the second and the third image processor 200, 300 includes DMA unit's 24, 34, which read image data stored in the image memory 25a, 35a in an area which is specified by CPU 21, 31, and transfer it to the DMA unit 14 of the first image processor 100. The DMA unit 14 then writes the transferred image data into the image memory 15a in an area specified by CPU 11.

Connected to the CPU 11 of the first image processor 100 are serial data communication lines from CPU's 21, 31 of the second and the third image processor 200, 300, and CPU 11, then acting as a master unit, commands CPU's 21, 31 (operating as slave units) of the second and the third image processor 200, 300 to conduct an image reading, a correction of read image and transfer of image data. On the basis of image data from the first camera 16b and image data which are transferred from the image processors 200, 300, CPU 11 detects a white line which partitions a lane, a curvature of the road, any vehicle running ahead on the lane or an obstacle located ahead on the image corresponding to a distance in a range from 10 to 90 m forward of the own vehicle. In addition, when there is a vehicle running ahead, CPU 11 calculates a target steer angle which is required to bring that vehicle to the center of the picture screen for each of the cameras. Also, where there is no vehicle running ahead, CPU 11 calculates a target steer angle which is required to bring the center of the lane to the center of the screen for each of the cameras. CPU 11 then transfers curvature information (radius of curvature) and information relating to a vehicle running ahead (or its forward position) to a host microcomputer (computer system essentially comprising CPU and thereafter referred to as MPU) 18 through a communication controller 17.

The target steer angle An which is directed to the first camera 16b is fed to the steering controller 16e while the target steer angles Bn and Cn which are directed to the second and the third camera 26b, 36b, respectively, are transferred to CPU's 21 and 31 through the serial communication line. These CPU's 21, 31 then feed the received target steer angles Bn and Cn to steering controllers 26e, 36e, respectively.

MPU 18 is a computer system which performs a vehicle speed control (constant speed running control/vehicle-to-vehicle distance control) and vehicle travelling direction control (a brake pressure control associated with each individual wheel brake), and utilizes information relating to a vehicle running ahead and information relating to the curvature of the road which are received from CPU 11 in performing its vehicle speed control and the vehicle travelling direction control.

Figure 9:
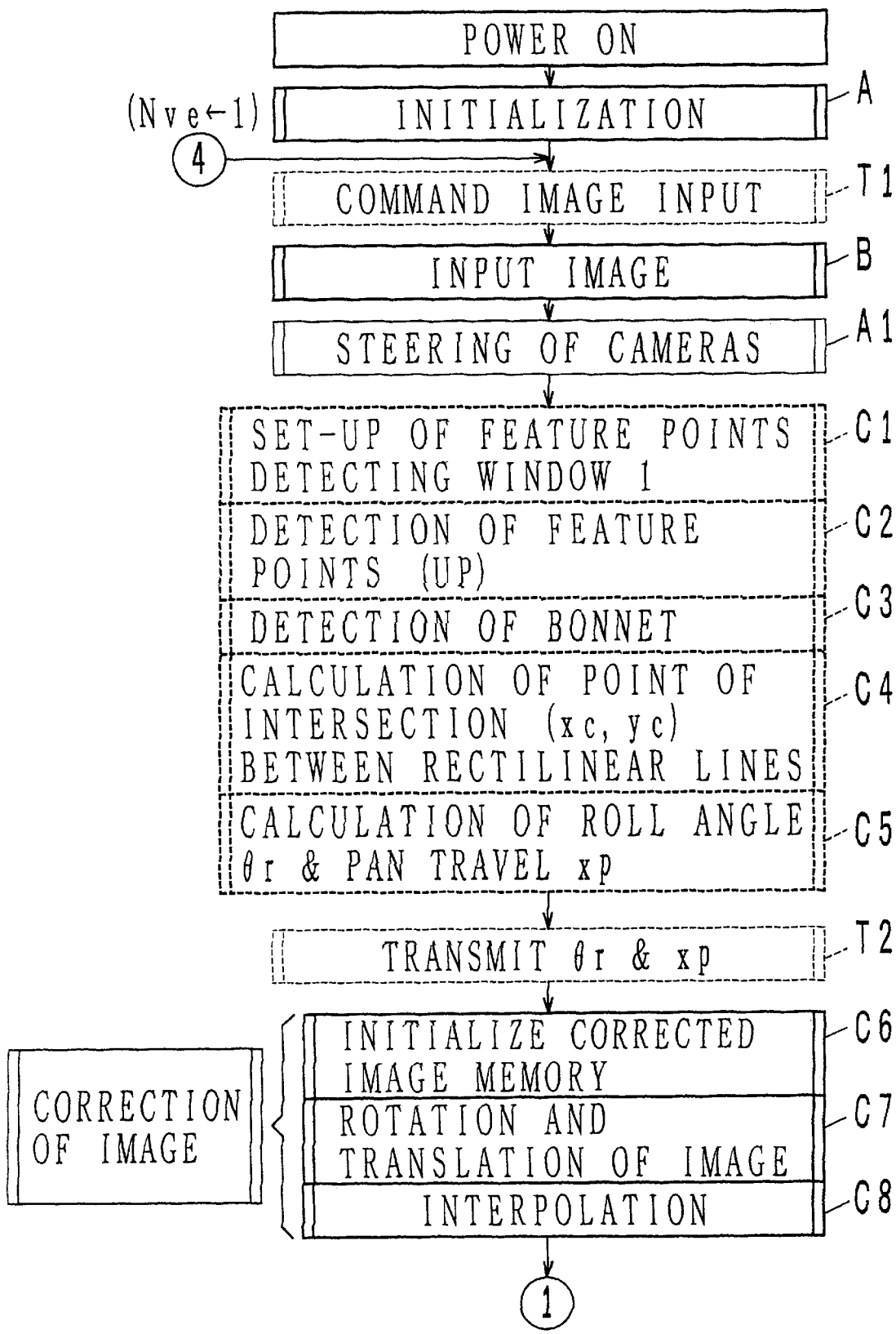
FIG. 9 is a flow chart indicating part of the operation performed by CPU 11 shown in FIG. 6, including a processing of image data and the detection of any vehicle running ahead.
Figure 10:
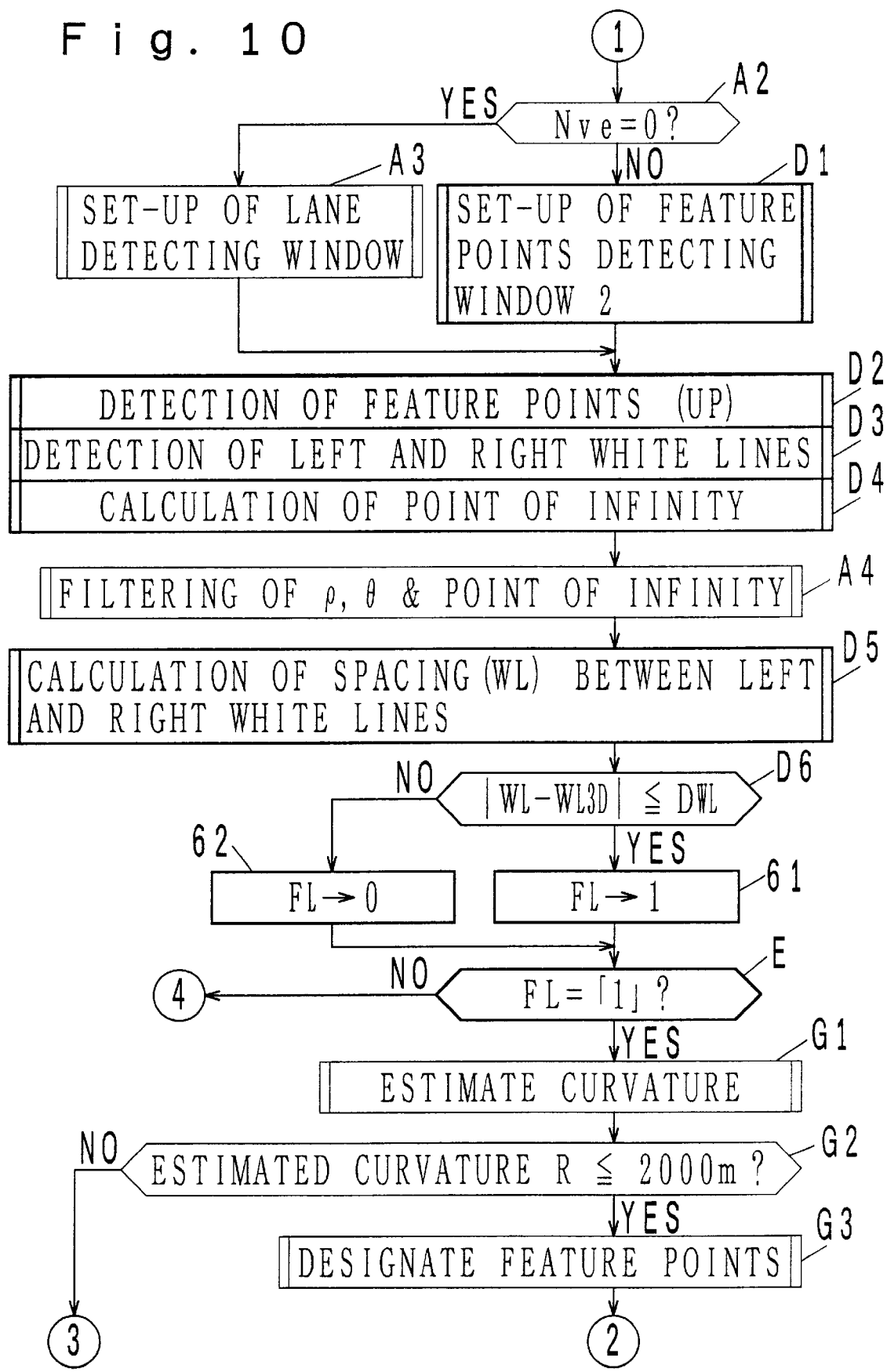
FIG. 10 is a flow chart continuing from the flow chart shown in FIG. 9 and illustrating another part of the operation performed by CPU 11.

FIGS. 9, 10 and 11 show a summary of the operation performed by CPU 11. The part of the operation of CPU 11 to process image data as shown in these Figures is common to or similar to the disclosure of the above cited U.S. patent application Ser. No. 08/183,369, filed on Jan. 18, 1994 by Jun SATO et al and entitled "METHOD OF DETECTING LINES APPROXIMATING AN IMAGE". In FIGS. 9 to 11, blocks representing operations which are substantially similar to the operation known by the disclosure of the cited Application are indicated in thick lines (thick solid line or thick broken lines). A block which represents an operation performed by CPU 11 of the present embodiment and which is not disclosed in the cited Application is indicated in thin line (thin solid line or thin broken lines). Blocks representing operations performed by CPU's 21 and 31 and which are similar to the operations performed by CPU 11 are indicated in solid line (either thick or thin solid line). Finally, a block representing an operation which is executed by CPU 11 alone is indicated in broken lines (either thick or thin broken lines). Referring to FIGS. 9 to 11, the operation performed by CPU 11 will now be described together with the operations performed by CPU's 21 and 31.

Referring to FIG. 9 initially, CPU 11 of the first image processor 100 performs an initialization (at step A) when the power supply is turned on, thus initializing input/output ports, internal registers and internal counters, followed by commanding CPU's 21, 31 of the second and the third image processor to perform an image reading (step T1).

CPU 11 then performs a digital conversion of the analog picture signal corresponding to one screen at a given period for writing it into an input data storage area of the image memory 15a (at step B). In response to the command for an image reading, CPU's 21, 31 also write picture data corresponding to one screen into the image memories 25a, 35a, respectively.

Upon entry of the image data corresponding to one screen into the memories, CPU's 11, 21 and 31 feed target steer angles A, B and C to steering controllers 16e, 26e and 36e, respectively (at step A1). The target steer angles A, B and C are already written into registers A, B and C, respectively, and assume an initial value of 0, and assumes a calculated value upon execution of "calculation of camera steer angle" (at step A5), which will be described later.

Then follow "set-up of feature points detecting window 1" (at step C1) to "calculation of roll angle θr and pan travel xp" (at step C5), which are executed by only CPU 11. The detail of these routines will be described below.

C1. "set-up of feature points detecting window 1" (FIG. 12)

Figure 12A:
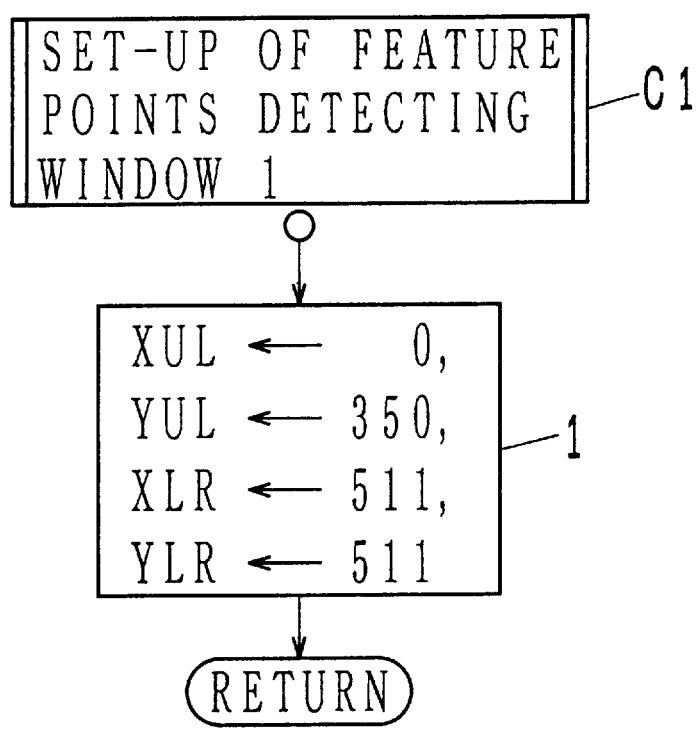
FIG. 12a is a flow chart illustrating the detail of "set-up of feature points detecting window 1" C1 shown in FIG. 9.

The detail of this routine is shown in FIG. 12a. As shown in FIG. 12b, the left, upper corner of the screen for the first camera (its image data being gradation data stored in input data memory) 16b is chosen as the origin (0, 0), and an image region defined by a point (0, 350) and another point (511, 511), representing diagonal corners, is established as a region for detecting feature points or window 1. Specifically, the x coordinate 0 of the left, upper corner of this region to be established is written into register XUL, y-coordinate 350 is written into register YUL, x-coordinate 511 of the right, lower corner of the region is written into register XLR, and y-coordinate 511 is written into register YLR (at step 1 in FIG. 12a). Data stored in these registers are represented in the following description by the designation of registers themselves.

As indicated in FIG. 12b, the "set-up of feature points detecting window" at step C1determines a block shown in chain lines or the feature points detecting window 1 as a region which is subject to "detection of feature points (UP)" (at step C2). It will be noted that this region fully contains an image of a free end or edge of bonnet of a vehicle, as illustrated in FIG. 12b. Then "detection of feature points (UP)" is executed at step C2.

C2. "detection of feature points (UP)" (step C2)

Here, the absolute magnitude of a gradation derivative in the vertical or y-direction is calculated. Initially, picture elements on the leftmost column (as represented by a line x=0) are sequentially specified as a picture element of interest beginning with a picture element (0, 509) which is located two picture elements above the left, lower corner (0, 511) of the window 1 until the y-coordinate is successively reduced to 350, and these picture elements are scanned in the y-direction from bottom to top. For each picture element of interest (xs, ys), a sum of brightness represented by the gradation data of a picture element (xs, ys+1) which is located one picture element below the picture element of interest, and of picture element (xs, ys+2) which is located two picture elements below the picture element of interest is formed, as is a sum of brightness represented by gradation data from picture element (xs, ys−1) which is located one picture above the picture element of interest and from another picture element (xs, ys−2) which is located two picture elements above the picture element of interest. The absolute magnitude of a difference between these sums is obtained as the absolute magnitude of the gradation derivative in the vertical direction. In this manner, a gradation derivative D (xs, ys) of the picture element of interest (xs, ys) is obtained.

Since the gradation derivative D (xs, ys) represents the absolute magnitude of a difference between a sum of image densities of two picture elements located above the picture element of interest (xs, ys) and a sum of image densities of two picture elements located below the picture element of interest, it represents a change in the density in the vertical direction above and below the picture element of interest. Accordingly, it assumes a high value where an image on the screen has a horizontally extending profile line. Thus, an examination is made to see if the gradation derivative D (xs, ys) is equal to or greater than a threshold value Th1, which is a preset value. If the derivative is equal to or greater than Th1, "1" is written into a binary data table, assigned to a given area within the image memory 15a at an address E (xs, ys) corresponding to the picture element of interest (xs, ys). The information "1" means that there is a horizontally extending profile line of an image. When the vertical scan for one column (x=0; y=509 to 350) is completed, the scan is shifted to the next adjacent column (which is represented by line x=1) where a similar operation is repeated. This operation is continued until the last line (x=511) is reached.

As a consequence, information representing a horizontally extending profile line of an image within the window 1 is written into the binary data table in the image memory 15a at addresses E (xs, ys) where xs is from zero to 511 and ys is from 509 to 350. Since the window 1 is chosen so as to contain an image of the free end or edge of the bonnet, it follows that the binary data table contains bonnet edge information. In the present embodiment, the free end or edge of the bonnet is assumed to be a rectilinear line, which is detected at detection of bonnets (step C3).

C3. "detection of bonnet" (FIG. 13)

A summary of this routine will be described first. A rectilinear line is detected by using Hough transformation which is known in the art. Hough transformation is a technique to represent information such as the binary data table, for example, which is represented in orthogonal coordinate system such as x-y coordinate system as used in representing the distribution of picture elements which are located within the window 1 in terms of the polar coordinate system ($\rho$-$\theta$ coordinate system) and the transformation is indicated below.

$$\rho = x \cos(\theta) + y \sin(\theta)$$

A point or picture element in the x-y coordinate system becomes a curvilinear line in the polar coordinate system where $\rho$ and $\theta$ are allocated to two orthogonal axes. Accordingly, when points which lie on a rectilinear line in the x-y coordinate system are represented by corresponding curvilinear lines in the coordinate system, these curvilinear lines intersect at a single point. When the point of intersection is substituted into an equation for transformation into the x-y coordinate system, an equation defining the rectilinear line in the x-y coordinate system is obtained.

In this manner, when a set of coordinates having information of "1", representing a feature point in the binary data table E (xs, ys), is transformed into corresponding values of polar coordinates, and a point of intersection between curvilinear lines in the polar coordinate system is obtained, and is then transformed into the x-y coordinate system, there is obtained a rectilinear line which joins feature points. It will be noted that a rectilinear line simply joining two points can be directly obtained in the x-y coordinate system, and there is no significance in performing the transformation into the polar coordinate system. However, the profile line at the free end of the bonnet may actually be curved, or may appear curved or roughened on the picture screen depending on the manner of impingement of light. Accordingly, when approximating the profile line of the bonnet with a rectilinear line, simply joining two points having information "1", representing a feature point in the binary data table E (xs, ys), may result in a too large an approximation error and may derive other than a profile line of the bonnet.

As shown in FIGS. 2 and 12b, the profile lines of the bonnet is distributed in an extensive area, and accordingly the binary data table E (xs, ys) contain a number of points having feature point information "1". This means that a number of rectilinear lines can be drawn which join two points or two picture elements having such information "1". When one rectilinear line descending to the right which typifies the group of rectilinear lines thus obtained is chosen, that provides a best approximation of the right half of the profile line of the bonnet (FIG. 13b). Similarly, when one rectilinear line descending to the left which typifies the group of rectilinear lines thus obtained is chosen, that provides a best approximation of the left half of the profile line of the bonnet (FIG. 13b). However, performing such a statistical treatment in the x-y coordinate system is very complicated.

Nevertheless, when the coordinate of a feature point having information "1" in the binary data table E (xs, ys) is transformed into the $\rho$-$\theta$ polar coordinate system, a point of intersection of curvilinear lines representing the individual feature points is concentrated to two points, corresponding to the profile lines representing the right half and the left half of the bonnet. Accordingly, the feature points in the binary data table E (xs, ys) are subjected to the Hough transformation, and the number of times curvilinear lines pass each point in the polar coordinate system or the number of curvilinear lines which pass through a single point is counted, and a point having a maximum number of such times and another point having the next maximum number of times are chosen, and these points chosen may be substituted into an equation for transformation into the x-y coordinate system, thus obtaining equations representing rectilinear lines representing the right half and the left half of the profile line for the bonnet. In this manner, the profile line representing the free end of the bonnet is detected through the Hough transformation and by counting the number of times curvilinear lines pass through each point on the $\rho$-$\theta$ polar coordinate system.

However, it will be seen that when the counting of the number of times curvilinear lines intersect with each other at a point on the $\rho$-$\theta$ polar coordinate system is conducted at each point in a region commensurate to the size of the binary data table E (xs, ys), the resulting counting operation will be quite voluminous, requiring an increased length of time in detecting the rectilinear lines. Accordingly, in the present embodiment, the origin (0, 0) of the $\rho$-$\theta$ polar coordinate system is chosen at a medium point as viewed in the lateral direction at the lowest end of the binary data table E (xs, ys), namely at x=255 and y=511. Then, the binary data table E (xs, ys) is equally halved in the lateral direction. Applying a first Hough transformation to the right half, feature points in the binary data table E (xs, ys) are transformed into a $\rho$-$\theta$ polar coordinate system of low density or of a large sampling pitch. The number of times curvilinear lines pass each point in this polar coordinate system or the number of curvilinear lines which pass through a single point is then counted, thus determining a first predicted point where the number of times is at maximum. Subsequently, a second Hough transformation is applied to establish a region of a smaller extent which is centered about the first projected point, and feature points in the binary data table E (xs, ys) is transformed into $\rho$-$\theta$ polar coordinate system of a medium density which is commensurate in size with this region. The number of times curvilinear lines pass each point in this polar coordinate system is counted, thus determining a second predicted point where the number of times is at maximum. Subsequently, a third Hough transformation is applied to establish a region of still smaller extent which is centered about the second predicted point. Feature points in the binary data table E (xs, ys) are transformed into the $\rho$-$\theta$ polar coordinate system of high density which is commensurate in size to this region. The number of times curvilinear lines pass each point in this polar coordinate system is counted, thus determining a third predicted point where the number of times is at maximum. A rectilinear line which is represented by the third predicted point is determined as one representing the right half of the profile line of the bonnet (step 12R to 14R in FIG. 13a). Similarly, a first, a second and a third Hough transformation are applied to the left half of the binary data table E (xs, ys), thus determining a rectilinear line which represents the left half of the profile line of the bonnet (steps 12L to 14L in FIG. 13a).

Figure 13A:
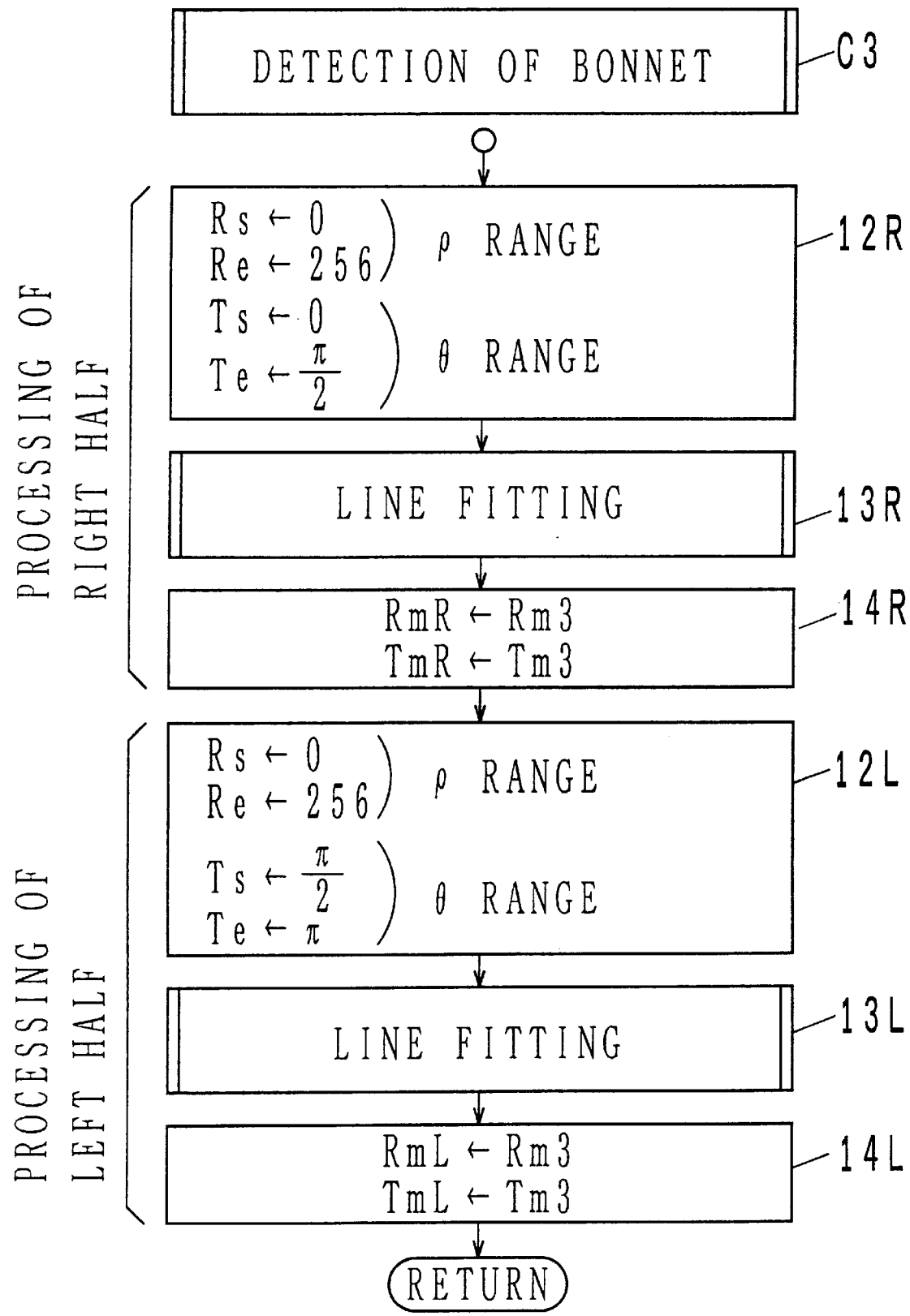
FIG. 13a is a flow chart showing the detail of "bonnet detection" C3 shown in FIG. 9.
Figure 13B:
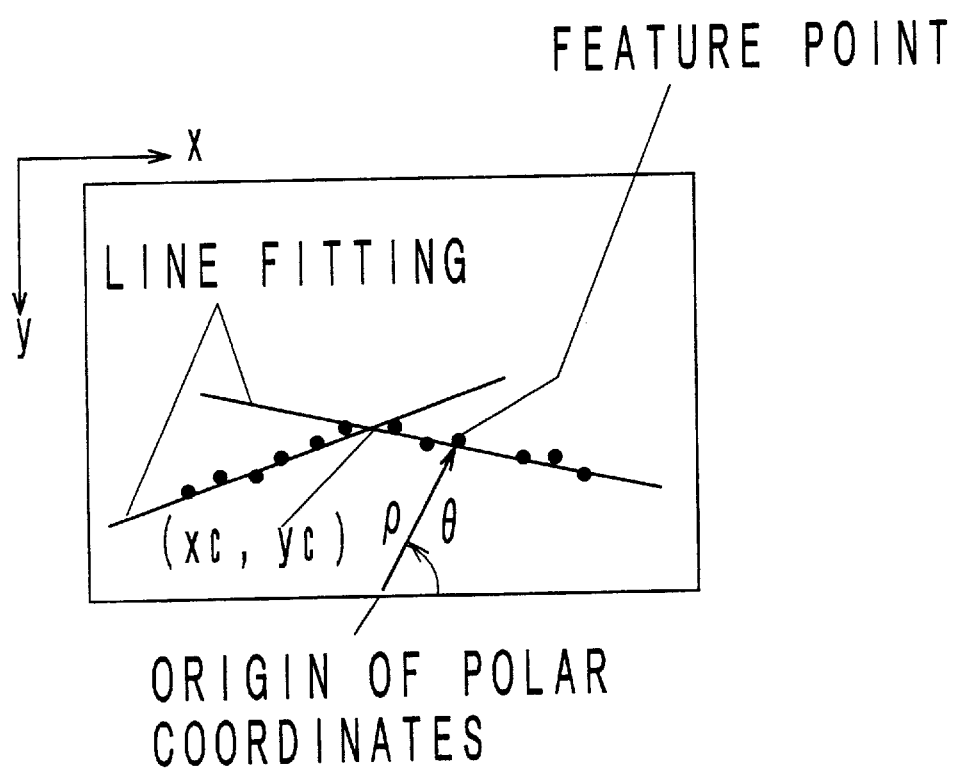

Referring to FIG. 13a, the detail of "detection of bonnet" will be described. Initially, parameters which are used for detecting a rectilinear line which approximates the right half of the profile line of the bonnet are established (at step 12R). A point (Rm3, Tm3) which corresponds to the approximate rectilinear line is then detected (at step 13R) where Rm3 represents the p-value and Tm3 represents $\theta$-value in the $\rho$-$\theta$ polar coordinate system. The coordinates of the point thus obtained are stored in registers RmR, TmR (at step 14R). A similar operation is repeated in order to detect a rectilinear line which approximates the left half of the profile line of the bonnet (at steps 12L to 14L). A procedure of "line fitting" which takes place at steps 13R and 13L for detecting rectilinear lines is disclosed in detail in pending U.S. patent application Ser. No. 08/183,369, filed on Jan. 18, 1994 by Jun SATO et al and entitled "METHOD OF DETECTING LINES APPROXIMATING AN IMAGE", and therefore will not be specifically described herein. The "line fitting" which takes place at step 13R detects a rectilinear line lying in the right half of the window 1 (FIG. 2) while the "line fitting" which takes place at step 13L detects a rectilinear line lying in the left half.

Rectilinear lines which are thus obtained by "line fitting" (at steps 13R and 13L) are represented as points (RmR, TmR) and (RmL, TmL) in the polar coordinate system, and they can be represented in the x-y coordinate system as follows:

$$RmR = x \cos(TmR) + y \sin(TmR)$$

$$RmL = x \cos(TmL) + y \sin(TmL)$$

These rectilinear lines appear as shown in FIG. 13b.

Figure 14:
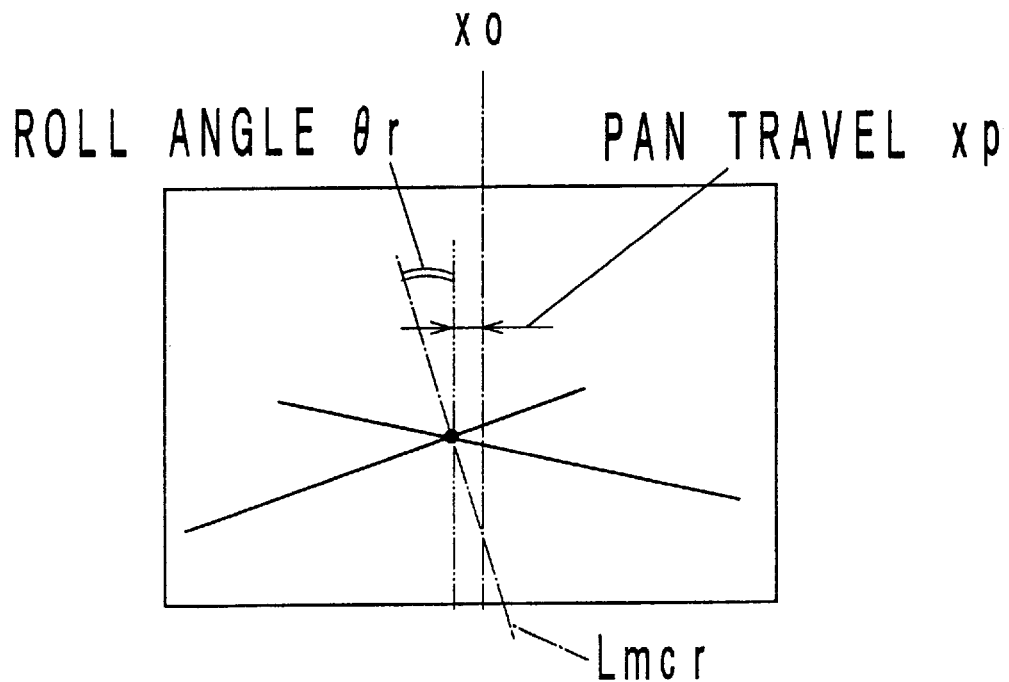

C4. "calculation of point of intersection between the rectilinear lines" (FIG. 14)

Upon completion of the "detection of bonnet" which took place at step C3, CPU 11 calculates a point of intersection (xc, yc) between these rectilinear lines at step C4 in a manner illustrated below.

$$xc = xch + [RmR \times \sin TmL - RmL \times \sin TmR]/[\cos TmR \times \sin TmL - \cos TmL \times \sin TmR] \quad (1)$$

$$yc = ych + [RmR \times \cos TmL \times RmL \times \cos TmR]/[\sin TmR \times \cos TmL - \sin TmL \times \cos TmR] \quad (2)$$

In this calculation, xch represents a center position in the x direction of a region corresponding to the binary data table E (xs, ys) (xch=255), ych represents the lowest position (ych=509), and a point (xch, ych) represents the origin of the polar coordinate system which is used during the detection of the rectilinear lines.

C5. "calculation of roll angle and pan travel" (FIG. 14)

A roll angle refers to an angle $\theta r$ formed between a line which bisects the angle of intersection between the two rectilinear lines mentioned above or the longitudinal axis of the vehicle and y-axis of the picture screen, or an angle formed between the centerline of the field of view of the first camera 16b and the longitudinal axis of the vehicle when they are projected onto the horizontal plane, or an angle of offset in the rolling direction of the centerline of the field of view of the first camera 16b with respect to the longitudinal axis Lmcr of the vehicle. A pan travel xp represents lateral offset of the center of the free end of the bonnet, namely, the point of intersection between the two rectilinear lines mentioned above with respect to the longitudinal axis which bisects the picture screen in the lateral direction. When recognizing a vehicle which is running ahead of the own vehicle and calculating a vehicle-to-vehicle distance, increased values of the roll angle $\theta r$ or pan travel xp increase the probability that a vehicle or an object located in the offset direction from the traveling direction of the own vehicle may be mistaken as one located on the lane on which the own vehicle is running. This probability can be reduced by adjusting the angle of mounting the camera 16b so that both the roll angle $\theta r$ and pan travel xp be nullified. However such adjustment is difficult and troublesome to perform. Accordingly, a degree of roll angle $\theta r$ and pan travel xp are unavoidable. In the present embodiment, the roll angle $\theta r$ and pan travel xp are adjusted to zero on the screen at "correction of screen" which takes place at step C, and the steps C1 to C4 are performed in order to calculate the amount of such adjustment. In addition, during "calculation of roll angle and pan travel" which takes place at step C5, the roll angle θr and pan travel xp are calculated as indicted below, and are stored in roll angle register θr and pan travel register xp.

$$\theta r = (TmL + TmR)/2 - \pi/2 \qquad (3)$$

$$xp = xc - 256 \qquad (4)$$

CPU 11 transmits the calculated roll angle θr and pan travel xp to CPU's 21 and 31 through the serial data communication line extending between CPU's (at step T2 in FIG. 9).

C6–8. "correction of image" (at steps C6–8)

Each of CPU's 11, 21 and 31 executes "correction of image". This operation will be described below with reference to CPU 11, but it should be understood that CPU's 21, 31 operate in the similar manner. Summarizing the "correction of image", this includes "initialization of corrected image memory" at step C6, "rotation and translation of image" at step C7 and "interpolation" at step C8. CPU 11 transforms the addresses x, y used to specify gradation data of each picture element in the image memory 15a into addresses x', y' obtained after rotation and translation in the manner corresponding to the roll angle θr and the pan travel xp, as indicated below, so as to enable gradation data to be written into corresponding corrected addresses:

$$\begin{pmatrix} x' \\ y' \end{pmatrix} = \begin{pmatrix} \cos\theta r & \sin\theta r \\ -\sin\theta r & \cos\theta r \end{pmatrix} \begin{pmatrix} x - xo \\ y - yo \end{pmatrix} + \begin{pmatrix} yo - xp \\ yo \end{pmatrix}$$

where x': corrected x-coordinate
where y': corrected y-coordinate
θr: roll angle
xp: pan travel
x: original x-coordinate
y: original y-coordinate
xo: x-coordinate of the center of image (xo=256)
yo: y-coordinate of the center of image (yo=511)

C6. "initialization of corrected image" (step C6)

When the described rotation and translation is made, there occurs a picture element or elements where the gradation data is not present on the corrected screen. To allow such picture elements to be recognized subsequently, during the "initialization of corrected image", data representing "−1" which does not exist in the image data or gradation data is written into the corrected image data at all addresses.

C7. "rotation and translation of image" (step C7)

The rotation and translation mentioned above now takes place. In this instance, each address (x, y) of the data memory where x=0 to 511 and y=0 to 511 is transformed into a corresponding address (x', y') where x'=0 to 511 and y'=0 to 511 in the coordinate system of the screen with θr=0 and xp=0 (namely, corrected image memory), and gradation data at an address (x, y) of the original image memory is written into the corrected image memory at a transformed address (x', y'). If the gradation data in the corrected image memory were displayed on a two dimensional display, an image as illustrated in FIG. 2 will be displayed in which the roll angle θr and the pan travel xp as shown in FIG. 14 are both substantially equal to zero. However, as a result of the "rotation and translation of image", there may be an address or addresses in the corrected image memory where the gradation data is not present, thus producing vacant picture element or elements. In such instance, there remains data representing "−1" as a result of the "initialization of corrected image" which took place at step C6.

C8. "interpolation" (step C8)

Figure 15:
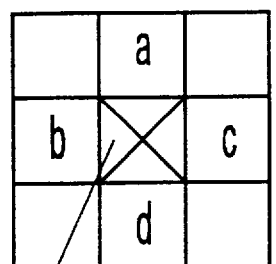
FIG. 15 is a plan view showing the distribution of picture elements a to d which are referred to when calculating image data from a picture element of interest at "interpolation" C8 shown in FIG. 9.

During the "interpolation", a mean value of gradation data of four picture elements which surround a particular picture element in which no gradation data is present is allocated to the particular picture element. If any one of the surrounding four picture elements is a vacant picture element, such allocation is not made. During the "interpolation", an address in the corrected image memory is sequentially specified, and an examination is made to see if the specified picture element or a picture element of interest is a vacant element, namely a picture element in which stored data represents "−1". If the picture element e of interest is a vacant element, the presence of gradation data in a picture element b which is neighboring to the left, a picture element c which is neighboring to the right, a picture element a which is on top of the picture element e, and a picture element d which is neighboring below is examined in the sequence named, as illustrated in FIG. 15. If any one of these four picture elements is found to be a vacant picture element, the treatment of the picture element of interest e is completed wherewith, thus leaving it intact. Then, a picture element of interest is transferred to the next. When it is found that each of the four picture elements a to d has gradation data therein, such gradation data is added to the content of an accumulation register Is, and a sum obtained is used to update the accumulation register Is, and a number of accumulation register Ns is incremented by one. When the accumulation is completed with all of the four picture elements a to d, a mean value Ic (x, y) of gradation data of these picture elements is calculated, and is stored at the address of the picture element of interest e.

This completes the "correction of screen" which takes place at steps C6 to C8 and which is shown in FIG. 9. Subsequently, CPU's 11, 21 and 31 examine whether data in a register Nve is equal to 0, meaning the success of tracking a point of infinity (which will be described later) at step A2 in FIG. 10. Referring to "calculation of point of infinity" which takes place at step D4 to be described later, when CPU 11 has successfully detected the left and the right white line which partition a lane on which an own vehicle is running and has also successfully calculated a point of intersection therebetween, which is a point of infinity, data in register Nve is 0. When data in register Nve is 0, CPU 11 executes "set-up of lane detecting window" (at step A3), and if data in register Nve is not equal to 0, it executes "set-up of feature points detecting window 2" (at step D1). Both CPU's 21 and 31 operate similarly.

A3. "set-up of lane detecting window" (step A3)

In order to eliminate background images such as trees, shoulder of road or the like (these are considered as disturbances) and to allow the edge of only the white lines on the road to be detected, a window which defines an extent over which the edge detection is made is established. To speed up the rate with which the detection of white lines can be completed, data which defines a plurality of lane detecting windows which may be selectively used depending on the configuration of lanes is stored in ROM 12. On the basis of the point of infinity (xv, yv) which is calculated during the "calculation of point of infinity" which takes place at step D4 and the beginning positions (xL, yL) and (xR, yR) of the left and the right white lines on the screen which are calculated during the "calculation of spacing between left and right white lines (WL)" which takes place at step D5, the lane detecting window is determined.

The lane detecting window is in the form of an inverted V as shown in FIG. 16, and includes a total of 45 patterns, 5 patterns for the apex and 3 patterns for each of left and right ends. The window configuration of each pattern is determined to enable a white line to be captured, as follows:

(1) window breadth (WC, WL, WR: FIG. 16)

A breadth to accommodate for a variation in the tilt angle of the cameras 16b, 26b and 36b which results from a pitching motion of the vehicle.

(2) apex coordinate (c0 to c4: FIG. 16)

A x-coordinate or the position in the lateral direction which allows the point of infinity to be captured within the window when the point of infinity moves across the screen as a result of yaw angle between the vehicle and the white line, the curvature of the road and the steering operation applied to the cameras 16b, 26b and 36b.

(3) the coordinates of left and right ends (L0, L1, L2, R0, R1, R2: FIG. 16)

A y-coordinate or the position in the fore-and-aft direction which allow the white line to be captured within the window if the position of the lane which is displayed on the left and right end of the screen changes as a result of a yaw angle between the vehicle and the white line, the curvature of the road and the steering operation applied to the cameras 16b, 26b and 36b.

The dimensions shown in FIG. 16 are measured in unit of picture element and are given below.

Pitch between window apices c0 to c4 or c(n−1)−cn:

Camera 16b: 50

Camera 26b: 70

Camera 36b: 80

It is to be noted that c2, which is centrally located, represents the center of the screen as viewed in the x direction.

Pitch between either left or right ends of the window L0 to L2, R0 to R2 or Ln−L(n−1) or Rn−R(n−1):

Camera 16b: 60

Camera 26b: 70

Camera 36b: 80

It is to be noted that L1 and R1 represent a reference breadth of a lane, and represent the position of opposite ends corresponding to the edges of white lines (or approximating rectilinear lines) appearing on the screen when the lane extends in a horizontal plane and rectilinear and when the vehicle is running along the center of the lane.

Latitude Wc of window apex:

Camera 16b: 50

Camera 26b: 70

Camera 36b: 80

Latitude WL, Wr of opposite ends of window:

Camera 16b: 60

Camera 26b: 70

Camera 36b: 80

During the "set-up of lane detecting window" which takes place at step A3, CPU 11 retrieves one of C0 to c4, denoted as ci, which is closest to the x-coordinate (xv) of the point of infinity which is previously detected. This x-coordinate, and the y-coordinate of the point of infinity which is previously detected are chosen to define the apex of a reference position of the lane detecting window (namely, inverted V-line). One of L0 to L2, denoted as Li, and one of R0 to R2, denoted as Ri, which is closest to the y-coordinates (yL, yR) of the beginning positions (xL, yL), (xR, yR) of the left and right white lines previously detected as they appear on the screen are also retrieved, and the x-coordinate of the beginning position which is previously detected and the y-coordinate of the point detected are chosen to define the left and the right end of the window (inverted V-line) at its reference position. The three points which are defined in this manner in combination with WC, WL and WR define a region on the screen, which is established as lane detecting window. It is to be noted that the memory to which the lane detecting window is applied is the corrected image memory.

D1. "set-up of feature points detecting window 2" (step D1)

This set-up is similar to the "set-up of feature points detecting window 1" which takes place at step C1, but it should be noted that the window 2 differs from the window 1 in respects of the size and the position, and in addition, the window 2 is applied to the corrected image memory. As illustrated in FIG. 2, the window 2 is located above the window 1.

D2. "detection of feature points (UP)" (step D2)

When the window 2 is established, a feature point or points located within the window 2 as detected from the corrected image memory are detected. This detection is similar to the "detection of feature points (UP)" which took place at step C2. In the "detection of feature points (UP)" which takes place at step D2, "1" representing a feature point is written into the binary data table E (xs, ys). However, it is to be noted that there is difference in that the region which is subject to the detection is the window 2 and that data being processed are those stored in the corrected image memory.

When the lane detecting window is established, any feature point located within the region defined by the lane detecting window and as stored in the corrected image memory is detected.

D3. "detection of left and right white lines" (step D3)

Here again, a processing operation similar to that occurring in the "detection of bonnet" which took place at step C is employed to detect a rectilinear line which approximates the white line at the right end of the lane on which the own vehicle is running and another rectilinear line approximating the white line at the left end of the lane are detected. However, because the window 2 or the lane detecting window are different in size and position from the window 1, the origin of the polar coordinates is different (see FIG. 2).

"line fitting"

It should be noted that "line fitting" is applied to the right half of the window 2 or lane detecting window. Initially, a feature point in the binary data table E (xs, ys) is transformed into the ρ-θ polar coordinate system, and the number of times curvilinear lines pass through each point (r, t) of this coordinate system is written while clearing data in a data table HGn (r, t) where n=1, allocated to an area within the image memory 15a. Subsequently, parameters of Hough transformation (region of transformation and density of Hough transformation) are set up, followed by performing a first Hough transformation HG1.

"Hough transformation (HG1)"

During this operation, an examination is made to see if there is a feature point having "1" information in the right half of a region of the corrected image memory which corresponds to the window 2 for one screen. Each time a feature point is found, the point is transformed into a position (r, t) in the polar coordinate system having its origin at (xch=255, ych=350) and having θ in a range from 0 to π/2 and in unit of (π/2)×(1/32) and where t equal from 0 to 31 and r is calculated as follows.

$$r = [(xs-xch)\cos\{(Te-Ts)\cdot t/Td+Ts\}+(ych-ys)\sin\{(Te-Ts)\cdot t/Td+$$

$$Ts\}-Rs]\times Rd/(Re-Rs) \qquad (5)$$

Then, data in the data table HGn, where n=1, at an address corresponding to the position (r, t) is incremented by one. Since a point on the x-y coordinate system becomes a curvilinear line when converted into the ρ-θ polar coordinate system. It follows that the converted position (r, t) will assume 32 values corresponding to t from 0 to 31, and the succession of these positions represents a curvilinear line. Since data in the data table HGn which is allocated to the position (r, t) is incremented by one, it follows that data at each address represents the number of times a curvilinear line on the polar coordinate system passes through each feature point on the x-y coordinate system.

The equation (5) can be rewritten as follows:

$$r/Rd/(Re-Rs)+Rs=(xs-xch)\cdot\cos\,[(t\cdot(Te-Ts)/Td)+Ts]+(ych-ys)\cdot\sin\,[(t\cdot(Te-Ts)/Td)+Ts] \qquad (5a)$$

This again can be modified as follows:

$$r/d+c=(xs-xch)\cdot\cos\,(a\cdot t+b)+(ych-ys)\cdot\sin\,(a\cdot t+b) \qquad (5b)$$

where
a=(Te−Ts)/Td,
b=Ts,
c=Rs,
d=Rd/(Re−Rs)

In these equations (5), (5a) and (5b), (xch, ych) represents the origin of the polar coordinate system on the x-y coordinate system, and here
xch=255
ych=350
xs represents a x-coordinate and ys a y-coordinate in the x-y coordinate system.

By representing $$\theta=[(t\cdot(Te-Ts)/Td)+Ts]$$

it follows that
θ=t·(π/2)/32
=(π/64)t
a=π/64, b=0, c=0, d=⅛

Because t assumes a value from 0 to 31, 32 ρ values r are calculated for θ=0, θ=π/64, θ=2π/64, θ=3π/64, . . . 31π/64 at a minimum unit of π/64. Thus, during the first Hough transformation, each feature point in the right half of the window 2 is transformed to a position (r, t) on the polar coordinate system where θ has a minimum unit of π/64 and lies in a range from 0 to less than π/2.

In the equations (5) and (5a), Rd/(Re−Rs) is given as follows:
Rd/(Re−Rs)=32/256
Since the unit of t is=π/64 or since π/2 is divided into 32 parts, a range of ρ from 0 to 256 is similarly divided into 32 parts. In other words, the unit of r is equal to 256/32.

In summary, during the "Hough transformation (HG1)", the equation (5) is specifically given as follows.

$$r=\{(xs-255)\cdot\cos\,[(t\cdot(\pi/64)]+(350-ys)\cdot\sin\,[(t\cdot(\pi/64)]\}\times \tfrac{1}{8} \qquad (5\text{-}1)$$

Modifying this into the configuration of the equation (5b), $$r/d1+c1=(xs-xch)\cdot\cos\,(a1\cdot t+b1)+(ych-ys)\cdot\sin\,(a1\cdot t+b1) \qquad (5\text{-}1b)$$

It follows that a1=π/64, b1=0, c1=0, d1=⅛.

In this manner, in the first Hough transformation, a rough choice is made by choosing the unit of θ to be equal to π/64 and choosing the unit of ρ to be equal to 256/32. Accordingly, the number of times a single feature point (xs, ys) is transformed into the polar coordinate system, or the number of times the calculation according to the equation (1) is made is drastically reduced, or the number of times t is changed is equal to 32. r data has a reduced number of bits, and each feature point can be converted into the polar coordinate system at a rapid rate. In addition, the counting operation can be completed rapidly.

Upon completion of "Hough conversion (HG1)", CPU 11 executes a first "search for maximum point".

First "search for maximum point"

Data (count) in the data table HGn, where n=1, at each address (r, t) is sequentially read out, and the read data is compared against data in a register Gm. If the read data is greater, the read data is used to update the register Gm, and at this time, "r" of the address (r, t) where the data is read out is used to update a register rm1while "t" of the address is used to update a register tm1. When such operation is completed for all the addresses within the data table HGn, the register Gm contains a maximum value of counts stored within the data table HGn while the registers rm1, tm1 contain the address (rm1, tm1) where the maximum count is stored.

Upon completion of the first "search for maximum point", CPU 11 transforms the address (rm1, tm1) which is represented in the r-t polar coordinate system into an address (Rm1, Tm1) in the ρ-θ polar coordinate system which corresponds to the screen in the x-y coordinate system. Here, $$Rm1=rm1\cdot(Re1-Rs1)/Rd1 \qquad (6)$$

$$Tm1=tm1\cdot(Te1-Ts1)/Td1$$

are calculated, and the calculated Rm1 is stored in register Rm1, and the calculated Tm1 is stored in register Tm1. It will be seen that
(Re1−Rs1)=256,
Rd1=32,
(Te1−Ts1)=π/2,
Td1=32
and hence the equation (6) means
Rm1=8.rm1
while the equation (7) means
Tm1=(π/64).tm1
Substitution of the addresses (Rm1, Tm1) into an equation for transformation into the x-y coordinate system yields an equation defining a rectilinear line which lies in the right half of the window 2 or lane detecting window. This rectilinear line is one detected as a result of the first Hough transformation of low density, and will be hereafter referred to as a first detected rectilinear line.

Subsequently, CPU 11 clears data in the data table HGn (r, t) which is allocated to an area within the image memory 15a, and sets up transformation parameters for the second Hough transformation (HG2). In the first Hough transformation, a range of Ts to Te for θ is chosen from 0 to π/2, the unit (Te−Ts)/Td is chosen equal to π/64, and a range Rs−Re of ρ is chosen from 0 to 256 with the unit Rd/(Re−Rs) equal to ⅛. However, in the second Hough transformation, the ranges of ρ and θ are centered about (Rm1, Tm1) and chosen to be smaller than before, with the unit chosen smaller than before. Specifically,
Rs=8(rm1−2)
Re=8(rm1+2)
Rd=32
Ts=(π/64)(tm1−2)

Te=$(\pi/64)$ (tm1+2)

Td=32

It is to be noted that rm1=Rm⅛, and tm1=Tm1/$(\pi/64)$. A second "Hough transformation (HG2)" then takes place.

"Hough transformation (HG2)"

The content of the second Hough transformation (HG2) is similar to the first Hough transformation (HG1), but the equation for calculation or the equation (5) is changed. Specifically, the equation (5) is replaced by the following equation (5-2):

$$r=\{(xs-255)\cdot\cos[t\cdot(\pi/512)+\pi(tm1-2)/64+(350-ys)\times\sin[t\cdot(\pi/512)+\pi(tm1-2)/64]-8(rm1-2)\}\times(1/1) \quad (5\text{-}2)$$

Modifying this into the configuration of the equation (5b):

$$r=d/2+c2=(xs-xch)\cdot\cos(a2\cdot t+b2)+(ych-yc)\cdot\sin(a2\cdot t+b2)$$

In contrast to the results of the first conversion which yielded a1=$(\pi/64)$, b1=0, c1=0, d1=⅛ the second transformation yields a2=$(\pi/512)$, b2=$\pi$(tm1−2)/64, c2=8(rm1−2), d2=1, Since t changes from 0 to 31, $\rho$ values r corresponding to at 32 points with a minimum unit of $(\pi/512)$, as indicated below, $\theta$=$\pi$(tm1−2)/64, $\theta$=$(\pi/512)$+$\pi$(tm1−2)/64, $\theta$=2$(\pi/512)$+$\pi$(tm1−2)/64, $\theta$=3$(\pi/512)$+$\pi$(tm1−2)/64,

. . .
. . .
. . .

$\theta$=31$(\pi/512)$+$\pi$(tm1−2)/64, are calculated. Thus, during the second Hough transformation, each feature point in the right half of the window 2 is transformed into a position (r, t) on the polar coordinate system for a range of $\theta$ from $\pi$(tm1−2)/64 to 31$(\pi/512)$+$\pi$(tm1−2)/64 with a minimum unit equal to $(\pi/512)$ or unit of t equal to $\pi/512$. $\rho$ ranges from 8(rm1−2) to 8(rm1+2), with the unit of $\rho$ being chosen to divided this range into 32 parts. In other words, the unit of r is equal to 32/32 equal 1. Stated differently, the second Hough transformation transforms a feature point in the right half of the window 2 into the polar coordinate system of a higher density and in a narrower range than the first Hough transformation. Since a transformation of a single feature point into the polar coordinate system during the second Hough transformation requires t to change from 0 to 31, or 32 times of calculation, and therefore, the required processing time remains on the same order as that required during the first Hough transformation. It will be noted that the number of times the calculation is employed to transform the feature point (xs, ys) into the polar coordinate system is minimized, r data has a reduced number of bits, and a rate at which the feature point is transformed into the polar coordinate system is rapid and that the counting operation is also rapid.

Upon completion of the second Hough transformation (HG2), CPU 11 executes a second "search for maximum point". This operation remains similar to the first "search for maximum point". When this operation is completed, register Gm contains a maximum value of counts stored in the data table HGn while registers rm2, tm2 contain an address (rm2, tm2) where the maximum count is stored.

Upon completion of the second "search for maximum point", CPU 11 transforms the address (rm2, tm2) expressed in the r-t polar coordinate system into an address (Rm2, Tm2) in the $\rho$-$\theta$ polar coordinate system which corresponds to the screen in the x-y coordinate system according to the equations given below.

$$Rm2=rm2\cdot(Re2-Rs2)/Rd2+Rs2 \quad (8)$$

$$Tm2=tm2\cdot(Te2-Ts2)/Td2+Ts2 \quad (9)$$

Calculated Rm2 is stored in register Rm2 and calculated Tm2 is stored in register Tm2. It is seen that (Re2−Rs2)=32

Rd2=32

(Te2−Ts2)=$\pi/16$

Td2=32

Accordingly, the equation (8) specifically means that $$Rm2=rm2+8rm1-16 \quad (8\text{-}1)$$

Similarly, the equation (9) means that $$Tm2=tm2\cdot(\pi/512)+(\pi/64)-(tm1-2) \quad (9\text{-}1)$$

Substitution of the address (Rm2, Tm2) into the equation for transformation into the x-y coordinate system yields an equation defining a rectilinear line located in the right half of the window 2 or the lane detecting window. This rectilinear line is one detected as a result of the Hough transformation of medium density and will be hereafter referred to as a second detected rectilinear line.

CPU 11 then clears data in the data table HGn (r, t) which is allocated to an area within the image memory 15a. It then sets up transformation parameters for a third Hough transformation (HG3). In this instance, a range for $\rho$ and $\theta$ is chosen to be centered about (Rm2, Tm2) and to be smaller than the range used during the second Hough transformation (HG2), the unit of $\rho$ and $\theta$ being also chosen smaller. Specifically, Rs=rm2+8rm1−18

Re=rm2+8rm1−14

Rd=32

Ts=$(\pi/512)$tm2+$(\pi/64)$tm1−9$\pi$/256

Te=$(\pi/512)$tm2+$(\pi/64)$tm1−7$\pi$/256

Td=32.

It will be noted that rm2 and tm2 are defined relative to Rm2 and Tm2 by the equations (8-1) and (9-1) given above. A third Hough transformation (HG3) then takes place.

"Hough transformation (HG3)"

The detail of the third Hough transformation (HG3) is similar to the second Hough transformation (HG2), but the content of the equation used for the calculation or the equation (5) is different. For the third Hough transformation (HG3), the equation (5) is replaced by equation (5-3) given below.

$$r=\{(xs-255)\cdot\cos[t\cdot(\pi/4096)+(\pi/512)tm2+(\pi/64)tm1-9\pi/256]+(350-ys)\cdot\sin[t\cdot(\pi/4096)+(\pi/512)tm2+(\pi/64)tm1-9\pi/256]-rm2-8rm1+18\}\times8 \quad (5\text{-}3)$$

Modifying this into the configuration of the equation (5b), $$r/d3+c3=(xs-xch)\cdot\cos(a3\cdot t+b3)+(ych-ys)\cdot\sin(a3\cdot t+b3) \quad (5\text{-}3b)$$

It will be seen that while the first and second conversion yielded a1=$(\pi/64)$, b1=0 c1=0, d1=⅛ a2=$(\pi/512)$, b2=$\pi$(tm1-2)/64
c2=8(rm1-2), d2=1
the third conversion yields:
a3=$(\pi/4096)$,
b3=$(\pi/512)$tm2+$(\pi/64)$tm1-9$\pi$/256
c3=rm2+8rm1-18
d3=8.
Since t changes from 0 to 31, $\rho$ values r corresponding to $\theta$ at 32 points (for t equal 0 to 31) with the minimum unit of $(\pi/4096)$, as indicated below,
$\theta$=$(\pi/512)$tm2+$(\pi/64)$tm1-9$\pi$/256,
$\theta$=$(\pi/4096)$+$(\pi/512)$tm2+$(\pi/64)$tm1-9$\pi$/256,
$\theta$=2$(\pi/4096)$+$(\pi/512)$tm2+$(\pi/64)$tm1-9$\pi$/256,
$\theta$=3$(\pi/4096)$+$(\pi/512)$tm2+$(\pi/64)$tm1-9$\pi$/256,
. . .
. . .
. . .
$\theta$=31$(\pi/4096)$+$(\pi/512)$tm2+$(\pi/64)$tm1-9$\pi$/256
are calculated. Specifically, by the third Hough transformation, each feature point in the right half of the window 2 or the lane detecting window is transformed into a point (r, t) on the polar coordinate system for a range $\theta$ of having a minimum unit of $(\pi/4096)$ (corresponding to one unit of t of $\pi/4096$) which is not less than
$\theta$=$(\pi/512)$tm2+$(\pi/64)$tm1-9$\pi$/256 and which is not greater than
$\theta$=31$(\pi/4096)$+$(\pi/512)$tm2+$(\pi/64)$tm1-9$\pi$/256. The range of $\rho$ is not less than
Rs=rm2+8rm1-18
and not greater than
Re=rm2+8rm1-14
and the unit of $\rho$ divides this range into 32 parts. Specifically, the unit of r is $4/32$=$1/8$. Thus, it will be seen that the third Hough transformation transforms a feature point in the right half of the window 2 or lane detecting window into the polar coordinate system of a higher density and in a narrower range than in the second Hough transformation. Transformation of a signal feature point into the polar coordinate system requires 32 times of calculation since t changes from 0 to 31, and accordingly, the procession time required remains on the same order as the second Hough transformation. It will be seen that the number of times the calculation is required to transform a single feature point (xs, ys) into the polar coordinate system is minimized, that r data has a reduced number of bits, that each feature point can be transformed into the polar coordinate system at an increased rate and that the counting rate is rapid.

Upon completion of the third Hough transformation (HG3), CPU 11 executes a third "search for maximum point". This operation is similar to the second "search for maximum point". Upon completion of this operation, register Gm contains a maximum value of counts stored in the data table HGn, and registers rm3, tm3 contain an address (rm3, tm3) where the maximum count is stored.

Upon completion of the third "search for maximum point", CPU 11 transforms the address (rm3, tm3) represented in the r-t polar coordinate system into an address (Rm3, Tm3) in the polar coordinate system which corresponds to the screen in the x-y coordinate system according to equations given below.

$$Rm3 = rm3 \cdot (Re3-Rs3)/Rd3+Rs3 \tag{10}$$

$$Tm3 = Tm3 \cdot (Te3-Ts3)/Td3+Ts3 \tag{11}$$

Calculated Rm3 is stored in register Rm3, and calculated Tm3 is stored in register Tm3. It will be seen that (Re3-Rs3)=4
Rd3=32
(Te3-Ts3)=$\pi$/128
Td3=32
The equation (10) means that $$Rm3 = (1/8)rm3+rm2+8rm1-18. \tag{10-1}$$

The equation (11) means that $$Tm3 = (\pi/128)tm3+(\pi/512)tm2+(\pi/64)tm1-9\pi/256. \tag{11-1}$$

Substitution of the address (Rm3, Tm3) into the equation for transformation into the x-y coordinate system yields an equation defining a rectilinear line located in the right half of the window 2 or the lane detecting window on the screen which displays image data stored in the corrected image memory. This rectilinear line is one detected as a result of the Hough transformation of high density, and will be hereafter referred to as a third detected rectilinear line. This completes line fittings.

It will be seen that as a result of the operations described above, there is obtained a rectilinear line or a third detected rectilinear line which represents a most typical rectilinear line on the image in the right half of the window 2 or the lane detecting window. It will be seen that the window 2 is established in a region which is suitable for detecting a white line located at the left or right end of a lane on which an own vehicle is running. When an image of white line at the right end of the lane is found in the right half of the window 2, it may be concluded that the probability that the third detected rectilinear line approximates this white line is high. Accordingly, the "line fitting" mentioned above represents a detection of a white line at the right end of the lane on which the own vehicle is running as found in the right half of the window 2.

Subsequently, CPU 11 stores Rm3 in register RmR and Tm3 in register TmR for the data (Rm3, Tm3) representing the third detected rectilinear line. In this manner, data representing the rectilinear line which represents the white line located at the right end of a lane on which the own vehicle is running is stored in registers RmR, TmR.

Detection of Left White Line

Then CPU 11 applies a similar processing operation as applied to the right half of the window 2 to the left half of the window 2, thus detecting a rectilinear line representing the white line located at the left end of the lane on which the own vehicle is running, and stores data which represents the rectilinear line in registers RmL, TmL. This completes "detection of left and right white lines" which takes place at step D3. CPU 11 then performs "calculation of point of infinity" at step D4.

D4. "calculation of point of infinity" (step D4)

During "calculation of point of intersection between rectilinear lines", a point of intersection (xc, yc) between a rectilinear line represented by data stored in registers RmR, TmR and which has been estimated as the white line located at the right end of the lane on which the own vehicle is running and a rectilinear line represented by data stored in registers RmL, TmL and which has been estimated as the white line located at the left end of the lane on which the own vehicle is running is calculated. A determination is then made to see if the point of intersection (xc, yc) which is calculated in this manner exists within a region centered about a point of infinity (xv, yv) represented by data stored in registers xv, yv and measuring 60 picture elements in both lateral and vertical directions. If it is determined that the point of intersection exists within this region, the reliability is high that the point of intersection (xc, yc) thus obtained represents a point of infinity. Accordingly, point of infinity data (xc, yc) is updated by applying a weight of ⅛ to the point of intersection (xc, yc) which is now obtained and adding it to the existing point of infinity data (xc, yc) to which a weight of ⅞ is applied. Then a register Nve is cleared which is used to count the number of times the tracking of a point of infinity failed.

When the point of intersection (xc,yc) which is now calculated does not lie in a region centered about the point of infinity (xv, yv) represented by data stored in registers xv, yv and measuring 60 picture elements laterally and 60 picture elements vertically, it is determined that the tracking of the point of infinity failed (either the current calculation of point of intersection is in error or the existing point of infinity data (xv, yv) is in error). Accordingly, register Nve is incremented by one, and an examination is made to see if the content of the register Nve has become equal to 5. If the content is equal to 5, this means that the calculation of point of intersection has been in error for five consecutive times including the current and past four calculations. This is regraded as indicating the fact that the point of infinity data (xc, yc) which is currently held is in error, and the point of infinity data (xc, yc) is updated to the point of intersection (xc, yc) which is now calculated.

A4. "filtering of ρ, θ & point of infinity" (step A4)

CPU 11 now applies a filtering to the parameters ρ, θ which represents a rectilinear line detected at "detection of left and right white lines" which took place at step D3 as well as the coordinates (xv, yv) of the point of intersection of the rectilinear lines which are calculated at "calculation of point of infinity" which took place at step D4. Thus $$\rho L=(3\cdot\rho L+RmL)/4 \tag{11L}$$

$$\rho R=(3\cdot\rho R+RmR)/4 \tag{11R}$$

$$\theta L=(3\cdot\theta L+TmL)/4 \tag{12L}$$

$$\theta R=(3\cdot\theta R+TmR)/4 \tag{12R}$$

are calculated, and are stored in registers ρL, ρR, θL and θR. It is to be noted that ρL, ρR, θL and θR appearing in parentheses of above four equations represent previous values of ρL, ρR, ρL and θR, and RmL and the like represent data stored in registers RmL and the like. A point of intersection (xv, yv) between a rectilinear line represented in terms of the calculated ρL, ρR and another rectilinear line represented by θL, θR is then calculated, and xv is written into register xv, and yv is written into register yv.

D5. "calculation of spacing between left and right white lines (WL)" (step D5)

CPU 11 then calculates a spacing (lane width) WL between the left and the right white line of the lane on which the own vehicle is running. In this instance, X position of a white line (ρL, θR) at the right end on the screen of a position L1, which is located at the center of the screen, where the centerline of the field of view of the camera 16b (shown in double dot chain lines in FIG. 17) intersects with the road surface is converted into an on-road surface position XR, and X position of a white line (ρL, θL) at the left end of the screen is converted into an on-road surface position XL, and a spacing WL=XR−XL is calculated as follows:

$$XR=(Sy\times Hc\times\sin\theta R)/(Sx\times\cos\theta R) \tag{13R}$$

$$XL=(Sy\times Hc\times\sin\rho R)/(Sx\times\cos\rho R) \tag{13L}$$

$$WL=XR-XL \tag{14}$$

Figure 17:
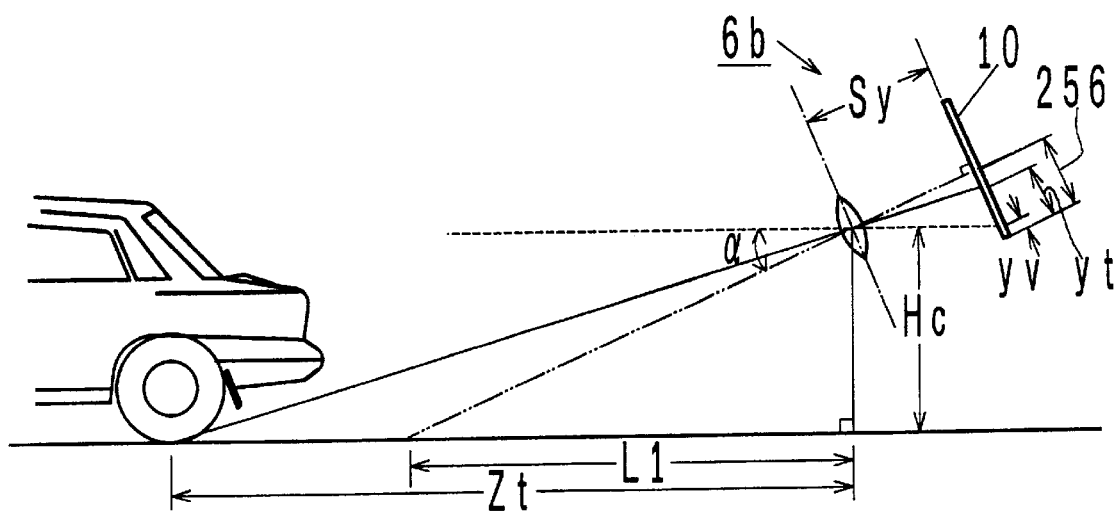
FIG. 17 is a side elevation illustrating the general geometrical relationship between a lens and camera element within the television camera 16b shown in FIG. 1a and a vehicle running ahead of an own vehicle.

It is to be noted that Sx and Sy shown in FIG. 17 represent scale factors of the camera 16b in the lateral and longitudinal direction, and Hc represents the elevation of the center of the lens of the camera 16b from the road surface.

CPU 11 then examines if the calculated lane spacing WL on the road surface is correct or if it has successfully detected the lane on which the own vehicle is running (at step D6). Specifically, it is examined if a deviation of WL with respect to a reference value WL3D is within a permissible range DwL. In the present embodiment because the lane width of the highway in Japan is chosen to be 3.5 m±0.2 m, the reference value WL3D is chosen to be 3.5 m and the permissible value DwL is chosen to be equal to 0.3 m.

If the deviation of WL with respect to the reference value WL3D is within the permissible range DwL, it is determined that the detection of the lane on which the own vehicle is running has been successful, and information "1" indicative of this is written into register FL. On the other hand, if the deviation of WL with respect to the reference value WL3D is beyond the permissible range DwL, it is determined that the detection of the lane on which the own vehicle is running failed, and a corresponding information "0" is written into register FL. This completes the "detection of lane on which own vehicle is running", and if the detection has been successful, register FL contains "1".

Upon completion of the "detection of own vehicle's lane" which took place at step D(D1 to D5), CPU 11 examines data stored in register FL, and if it is "1", it executes "estimation of curvature" (at step G1). Specifically, by using the relationship $$R=(L1/2)\cdot\sin A \tag{15}$$

a radius of curvature R is calculated. In this equation, L1 represents a distance from the camera 16b to a point where the centerline of the field of the view thereof intersects with a horizontal road surface (L1=15 m), and A represents the steer angle of the camera 16b (which is calculated at step A5 in FIG. 11). Next, an examination is made at step G2 to see if the radius of curvature is equal to or less than 2000 m, which is interpreted as an indication of the road being curved. If so, "designation of feature points" is executed at step G3.

G3. "designation of feature points" (step G3)

CPU 11 then extracts a feature point as one representing a right-hand white line, or as a right-hand curvilinear line since the road is curved, provided the feature point is located within the window 2 and within a preset half-width (±80 cm on the road surface) in the y direction and within five picture elements in the x direction as centered about picture elements located on the rectilinear line represented by data ρR, θR stored in registers ρR, θR up to the point of infinity (yv) in the y-axis direction. Similarly, CPU 11 extracts a feature point as one representing a left-hand white line or a left-hand curvilinear line since the road is curved, provided the feature point is located within the window 2 and within a preset half-width (±80 cm on the road surface) in the y direction and within five picture elements in the x direction as centered about picture elements located on the rectilinear line represented by data ρL, θL stored in registers ρL, θL up to the point of infinity (yv) in the y-axis direction.

G4A. "coordinate transformation" (step G4A)

Figure 18A:
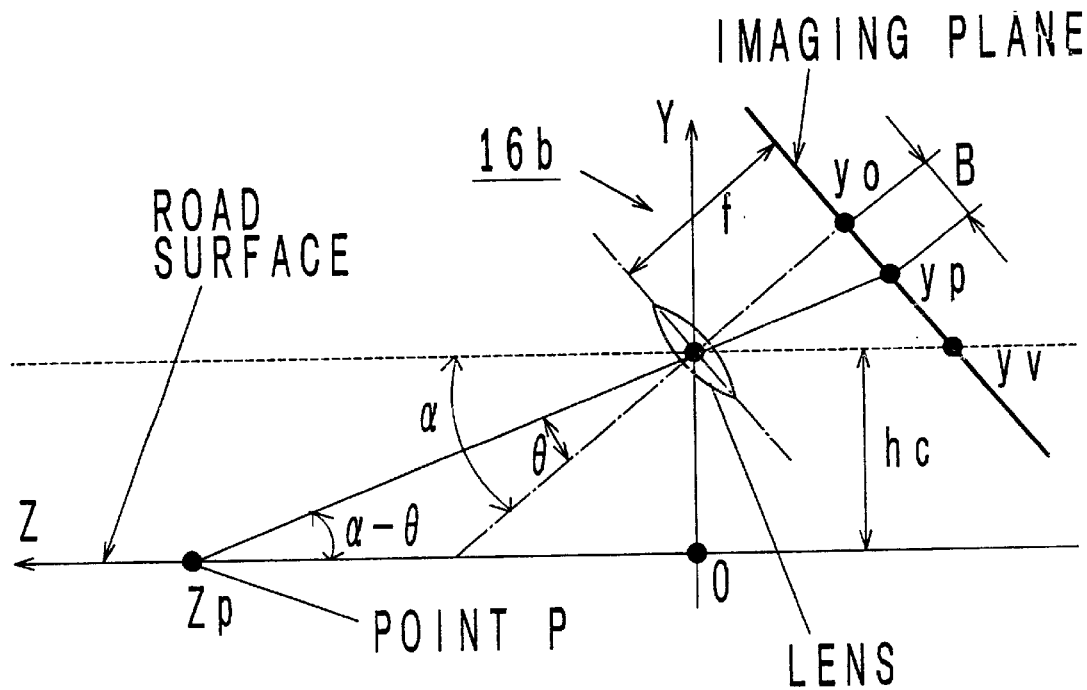
FIG. 18a is a side elevation indicating the general geometrical relationship between a lens and a camera element within the television camera 16b shown in FIG. 1a and a point P on the road surface located forward of an own vehicle.
Figure 18B:
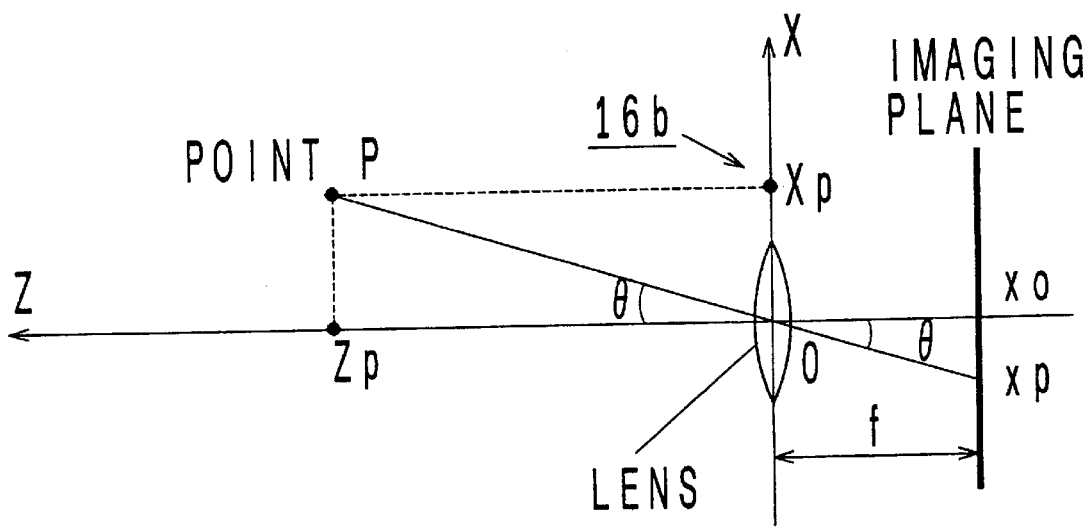
FIG. 18b is a plan view illustrating the general geometrical relationship between a lens and a camera element within the television camera 16b shown in FIG. 1a and a point P on the road surface located froward of an own vehicle.

CPU 11 then converts the coordinates of the feature point which is extracted at "designation of feature point" which took place at step G3 into the three dimensional coordinate system (X, Y, Z) on the road surface. X stands for the horizontal or lateral direction, Y the vertical direction, and Z the horizontal direction which is perpendicular to X and Y or in the fore direction of the vehicle. The side elevation and the plan view of the optical model of the camera 16b are shown in FIGS. 18a and 18b. It is assumed that the road surface represents a horizontal plane which is parallel to the Z-axis. Referring to FIG. 18a, assuming that a point P on the road surface signifies one of feature points, yp, it is seen that $$\tan(\alpha-\theta) = hc/Zp \quad (16)$$

$$\tan\theta = B/f \quad (17)$$

and from these relationships, Z-coordinates Zp of the point P is given as follows:

$$Zp = (f + B \cdot \tan\alpha) \cdot hc / (f \cdot \tan\alpha - B) \quad (18)$$

The angle by which the camera 16b is directed downward is given as follows:

$$\tan\alpha = (yo - yv)/f \quad (19)$$

By calculating tanα of the equation (19), and substituting it into the equation (18), Zp can be calculated. In these equations, yo represents the center position of the field of view of the camera coordinate system or screen coordinate system, yp the position of a feature point, B a displacement of the feature point relative to the center position of the field of view as considered on the y-coordinate of the camera system, and yv the y-coordinate of the point of infinity which is calculated at "calculation of the point of infinity" which took place at step D4.

It is to be noted that because the use of the tangent function in the calculation of a distance involves an increased length of processing time, an approximation is employed in the calculation. Since the relationship between the function tan β and the angle β can be approximated as tan β=β when β is close to 0, the equations (16), (17) and (19) can be approximated as follows:

$$\alpha - \theta = hc/Zp \quad (16a)$$

$$\theta = B/f = (yo - yp)/f \quad (17a)$$

$$\alpha = (yo - yv) \quad (19a)$$

and the equation (18) can be approximated as follows:

$$Zp = f \cdot hc / (yo - yv) \quad (18a)$$

During the calculation of the equation (18a), CPU 11 transforms the y-coordinate in the camera system of the feature point into the Z- coordinate Zp in the road system.

Referring to FIG. 18b, the point P on the road surface (corresponding to a feature point on the screen) and the focusing plane are related to each other as follows:

$$\tan\theta = Xp/Zp \quad (20)$$

$$\tan\theta = xp/f \quad (21)$$

where xp represents the x-coordinate of the feature point in the camera coordinate system. Using the equations (20) and (21), the x-coordinate Xp of the point P in the road coordinate system can be calculated as follows:

$$Xp = Zp \cdot xp / f \quad (22)$$

In this manner, CPU 11 calculates Xp by a calculation represented by the equation (22). It is to be noted that the Y-coordinate of the feature point in the road coordinate system (X, Y, Z) is chosen to be 0 in all instances in order to simplify the calculation.

G5A. "rotation correction of feature point" (step G5A)

Registers A, B and C store steer angles A, B and C (FIG. 5) for the cameras 16b, 26b and 36b, respectively, which are obtained at "calculation of camera steer angles" (step A5) which will be described later. During the rotation correction, CPU 11 converts position data (Zp, Xp) of a feature point which is converted into the road coordinate system in the manner mentioned above into values which are rotated through A about the vertical axis Y (FIG. 18a). This means that the direction of the feature point as viewed from the centerline of the field of view of the camera is converted into the direction of the feature point as viewed from the fore-and-aft axis of the vehicle. The position data (Zp, Xp) of the feature point before the rotation correction is that represented in coordinate system in which Z-axis coincides with the projection of the centerline of the field of view of the camera onto the horizontal plane. However, the rotation correction converts this position data (Zp, Xp) into that in the road coordinate system in which Z-axis coincides with the projection of the fore-and-aft axis of the vehicle onto the horizontal plane.

The processing operation performed by CPU 11 which covers a program portion beginning with "initialization of corrected image memory" at step C6 in FIG. 9 and extending through the program portion shown in FIG. 10 to "rotation correction of feature point" at step G5 in FIG. 11 is also executed by CPU's 21 and 31 with respect to image data which are obtained by the cameras 26b and 36b, respectively.

T3A. "accumulation of corrected data" (step T3A)

CPU 11 then writes the position data of the feature point to which the rotation correction is applied in the manner mentioned above (a total of two groups corresponding to right-hand and left-hand white line) into a camera 16b taken data region, including both a right-hand and a left-hand white line subregion, of a lane region data table which is allocated to a specified area of the memory 15a.

Subsequently, CPU 11 commands CPU 21, through the serial data communication line extending between CPU's, to transfer the position data of the feature point to which the rotation correction is applied in the manner mentioned above, and also commands DMA unit 14 to write data transmitted from DMA transfer unit 24 into a camera 26b taken data region of the lane region data table. In response to this command from CPU 11, CPU 21 specifies a memory region where the position data of the feature point to which the rotation correction is applied is stored, and commands DMA unit 24 to transfer such data. In response to this command, DMA unit 24 reads data from the memory region and deliver it onto DMA data line, whereupon DMA unit 14 writes it into the memory 15a. When DMA unit 24 annunciates the completion of the delivery, CPU 21 annunciates the completion of transfer to CPU 11.

In response to this annunciation, CPU 11 commands CPU 31, through the serial data communication line extending between CPU's, to transfer the position data of the feature point to which the rotation correction is applied in the manner mentioned above, and also commands DMA unit 14 to write data which is transmitted from DMA transfer unit 24 into a camera 36b taken data region of the lane region data table. In response to this command from CPU 11, CPU 31 specifies a memory region where the position data of feature point to which the rotation correction is applied is stored, and commands a data transfer for the DMA unit 34. In response to this command, DMA unit 34 reads data from the specified memory region, delivers it onto DMA data line, whereupon DMA unit 14 writes it into the memory 15a.

When DMA unit 34 annunciates the completion of delivery, CPU 21 annunciates the completion of transfer to CPU 11.

In the event, either CPU 21 or CPU 31 determines that the estimated radius of curvature R exceeds 2000 m at step G2, the steps G3, G4A and G5A are not executed, and accordingly, the corresponding CPU 21 or CPU 31 annunciate the absence of data to CPU 11. Thereupon CPU 11 proceeds to "coordinate transformation of $\rho$, $\theta$" (at step G4B), which will be described later.

G6A. "detection of curvilinear line (method of least squares)" (step G6A)

Subsequently, CPU 11 applies the method of least squares to the position data of feature points in the right-hand white line region of the lane region data table (an assembly of feature points obtained by the cameras 16b, 26b and 36b, respectively), thus calculating an arc represented by the distribution of these feature points, or a curvilinear line which approximates the right-hand white line. At this end, X, Z-coordinates of an arc end which is closest to the vehicle as viewed in the Z-direction, X, Z-coordinates of an arc end on the far side, X, Z-coordinates of an arc center, and a radius RR are calculated. These coordinates are of the road coordinate system which has the projection of the fore-and-aft axis of the vehicle onto the horizontal plane as its Z-axis at this stage. Then, the number of samples or the number of existent feature points is counted. Similarly, the method of least squares is applied to position data of feature points in the left-hand white line region of the lane region data table (also an assembly of feature points obtained by the cameras 16b, 26b and 36b, respectively), and an arc represented by the distribution of these feature points or a curvilinear line which approximates the left-hand white line is calculated, and the number of samples or existent feature points is counted.

G7. "decision of success or failure of detection of curvilinear line" (step G7)

CPU 11 then examines the two groups of samples or feature points and the radii R, namely, RR and RL, and if the number of samples for one of the groups is less than a given value or if one of the radius of curvature exceeds 2000 m, a failure of detection of a curvilinear line is declared, and a determination is made that the lane is rectilinear.

G9. "filtering of curvature R" (step G9)

When the number of samples or feature points of either group is equal to or greater than a given value and both radii of curvature RR, RL are equal to or below 2000 m, a success of detection of a curvilinear line is declared, and the radii RR, RL which are now detected are subject to a filtering operation, and their values are used to update radius registers RR, RL. Specifically, when the radius R which is now calculated is equal to or below 150 m, a coefficient Kw is chosen to be 16, when the radius exceeds 150 m and is less than 300 m, a coefficient Kw is chosen to be 8, and when the radius exceeds 300 m, a coefficient Kw is chosen to be 4. Then $$RR=[(Kw-1)\cdot RR+RR]/Kw \quad (23R)$$

$$RL=[(Kw-1)\cdot RL+RL]/Kw \quad (23L)$$

are calculated, and are used to update registers RR, RL. It is to be noted that RR and RL which appear in the items (Kw–1)RR and (Kw–1)RL are data stored in register RR and RL, respectively, before these registers are updated. When Kw is determined in the manner mentioned above, an increased value of the radii of curvature RR, RL calculated provides a greater relative contribution (weight) of the radii RR, RL which are now calculated with respect to the values of RR, RL which are obtained as a result of the filtering operation. In this manner, the values obtained by the filtering operation provides a high response to the calculated values. When the radii of curvature RR, RL which are calculated are small, the relative contribution (weight) of the radii RR, RL which are now calculated with respect to the values of RR, RL obtained by the filtering operation is reduced, thus reducing the response of these values with respect to the calculated values. The steer angles A, B and C of the cameras 16b, 26b and 36b, which are determined in accordance with the radius of curvature, are substantially inversely proportional to the radius of curvature. Accordingly, the significance of a control exercised by host MPU 18 in accordance with a curvature will be substantially inversely proportional to the radius of curvature. In the event the detection or calculation of a curvature involves a large error or has a degraded reliability, the camera may miss the lane on which the own vehicle is running if the radius of curvature is small, or the control exercised by the host MPU 18 in accordance with the curvature may become erroneous, thus degrading the reliability of the control. To improve this, a choice is made such that the values obtained by the filtering operation has a high response (low Kw) for large calculated values of RR, RL and a low response (high Kw) for small calculated values of RR, RL.

G4B. "coordinate transformation of $\rho$, $\theta$" (step G4B)

When the radius of curvature which is obtained at "estimation of curvature" which took place at step G1 exceeds 2000 m, when either CPU 21 or CPU 31 annunciates the absence of data to be transferred at "accumulation of corrected data" which took place at step T3A, or when a failure of detection of a curvilinear line is declared at "decision of success or failure of detection of curvilinear line" which took place at step G7, CPU 11 transforms the data ($\rho$L, $\theta$L), ($\rho$R, $\theta$R) which define a rectilinear line approximating left and right-hand white line of a lane on which the own vehicle is running, as obtained at "filtering of $\rho$, $\theta$ & point of infinity" at step A4 into data (Road-$\rho$L, Road-$\theta$L), (Road-$\rho$R, Road-$\theta$R) defining rectilinear lines in the road coordinate system (X, Y, Z) which has the projection of the centerline of the field of view of the camera onto the horizontal plane as its Z-axis. Both CPU's 21 and 31 performs a similar transformation when the radius of curvature R obtained at "estimation of curvature" which took place at step G1 exceeds 2000 m.

G5B. "rotation correction" (step G5B)

CPU 11 then applies a rotation correction corresponding to the steer angle A of the camera 16b to the data (Road-$\rho$L, Road-$\theta$L), (Road-$\rho$R, Road-$\theta$R), obtained by the above transformation, thus calculating data ($\rho$LR, $\theta$LR), ($\rho$RR, $\theta$RR) which define rectilinear lines as referenced to the fore-and-aft axis of the vehicle. In other words, data (Road-$\rho$L, Road-$\theta$L), (Road-$\rho$R, Road-$\theta$R) which define rectilinear lines in the road coordinate system which has the projection of the centerline of the field of view of the camera onto the horizontal plane as its Z-axis is transformed into data ($\rho$LR, $\theta$LR), ($\rho$RR, $\theta$RR) which define rectilinear lines in the road coordinate system which has the projection of the fore-and-aft axis of the vehicle onto the horizontal plane as its Z-axis. Both CPU's 21 and 31 perform a similar transformation.

T3B. "accumulation of corrected data" (step T3B)

CPU 11 acquires data ($\rho$LR, $\theta$LR), ($\rho$RR, $\theta$RR) defining rectilinear lines which are obtained by the transformation performed by CPU's 21 and 31 through the serial data communication line extending between CPU's.

When the estimated curvature R is determined to be equal to or less than 2000 m at step G2, CPU 21 or CPU 31 does not execute steps G4B and G5B. Accordingly, CPU 21 or 31 annunciates the absence of applicable data to CPU 11. In this instance, CPU 11 directly proceeds to next "detection of rectilinear line" (at step G6B).

G6B. "detection of rectilinear line" (step G6B)

CPU 11 calculates data (ρRRm, θRRm) and (ρLRm, θLRm) which defines a typical right-hand and a typical left-hand rectilinear line which typify or approximate the two groups of rectilinear lines in the left-hand and right-hand white line groups, as represented by three sets of rectilinear line defining data (ρLR, θLR), (ρRR, ERR) which CPU 11 itself has calculated and saved a similar data obtained by and transferred from CPU's 21 and 31. Of course, it is possible that such data is obtained only from CPU 11, or it is also possible that only two sets are available including one from CPU 11 and the other from either CPU 21 or 31. This takes place by forming a weighted mean. A weight of 8/16 is applied to data from CPU 11, a weight of 5/16 is applied to data from CPU 21, and a weight of 3/16 is applied to data from CPU 31.

G10. "estimation of left and right lanes" (step G10)

When proceeding from "filtering of curvature R" at step G9 to "estimation of left and right lanes" at step G10 CPU 11 compares data from radius register RR against data from register RL, which are obtained at step G9 by the "filtering of curvature R", thus determining if the curvature is right-hand or left-hand. In the event of a right-hand curvature, RR−WL is chosen as a radius of curvature of the right-hand white line of right adjacent lane, and RL+WL is chosen as a radius of curvature of the left-hand white line of a left adjacent lane. For a left-hand curvature, RR+WL is chosen as a radius of curvature of the right-hand white line of a right adjacent lane, and RL−WL is chosen as a radius of curvature of the left-hand white line of a left adjacent lane. WL represents data stored in register WL, and represents the width of the lane on which the own vehicle is running and which is calculated by CPU 11 at "calculation of spacing between left and right white lines (WL)" which took place at step D5 shown in FIG. 10.

When proceeding from the "detection of rectilinear line" at step G6B to the "estimation of left and right lanes" which takes place at step G10, a calculation is made of data (ρRRR, θRRR) defining a rectilinear line which is equivalent to the right typical rectilinear line (or data ρRRm, θRRm defining it) which is translated by WL to the right, and data (ρLLR, θLLR) defining a rectilinear line which is equivalent to the left typical rectilinear line (or data ρLRm, θLRm defining it) which is translated by WL to the left.

G12. "set-up of vehicle search area" (step G12)

When the success of detection of curvilinear line is declared, position data (Z, X) of individual sites located at 10 m, L1=15 m, 30 m, L2=45 m, 60 m, L3=75 m and 90 m (each indicating a Z-coordinate) indicated in FIG. 3 (which indicates the road coordinate system having the projection of the fore-and-aft axis of the vehicle onto the horizontal plane as its Z-axis) on an arc corresponding to the right-hand white line of the right adjacent lane and also on an arc corresponding to the left-hand white line of the left adjacent lane, which are calculated at the "estimation of left and right lanes" at step G10.

When a failure of detection of curvilinear line is declared, position data (Z, X) of sites located at 10 m, L1=15 m, 30 m, L2=45 m, 60 m, L3=75 m and 90 m shown in FIG. 3 and which are located on the rectilinear line corresponding to the right-hand white line of the right adjacent lane and on a rectilinear line corresponding to the left-hand white line of the left adjacent lane, which are calculated at the "estimation of left and right lanes" at step G10.

In this manner, six points, including a pair of sites at Z-coordinates of 10 m, 15 m and 30 m, respectively, which define a road area, including the lane on which the own vehicle is running, the right adjacent lane and the left adjacent lane, are defined within the coverage of the camera 16b, namely, in a region located 10 to 30 m forward of the own vehicle.

Similarly, six points, including a pair of left and right sites at z-coordinates of 30 m, 45 m and 60 m, which define a similar road area is defined within the coverage of the camera 26b, namely, in a region located from 30 to 60 m forward of the own vehicle.

Also, six points, including a pair of left and right sites at Z-coordinates of 60 m, 75 m and 90 m, which define a similar road area is defined within the coverage of the camera 36b, namely, in a region located from 60 to 90 m forward of the own vehicle.

G12. "inverse coordinate transformation of vehicle search area" (step G12)

CPU 11 applies a correction corresponding to the steer angle A of the camera 16b to the six points defined within the coverage of the camera 16b, thus transforming them into the road coordinate system having the projection of the centerline of field of view of the camera 16b onto the horizontal plane as its Z-axis before they are inversely transformed into coordinates on the picture screen of the camera 16b. Similarly, the six points defined in the respective coverages of the cameras 26b and 36b are inversely transformed into coordinates of the picture screens of the respective cameras.

T4. "accumulation of feature points within vehicle search area" (step T4)

Utilizing the serial data communication line extending between CPU's, CPU 11 supplies the inversely transformed coordinates of the six points defined within the coverage of the camera 26b to CPU 21, and commands CPU 21 to perform a pick-up of feature points in the area surrounded by the six points, a coordinate transformation (namely, a transformation into the road coordinate system having the projection of the field of view of the camera onto the horizontal plane as its Z-axis), and a rotation correction (namely, transformation into the road coordinate system having the projection of the fore-and-aft axis of the vehicle onto the horizontal plane as its Z- axis). Similarly, CPU 11 supplies the inversely transformed coordinates of the six points defined within the coverage of the camera 36b to CPU 31, and commands CPU 31 to perform a pick-up of feature points within the area surrounded by the six points, a coordinate transformation and a rotation correction.

Subsequently, CPU 11 picks up feature points stored within the memory 15a in the area defined by the six points, which is enclosed by folded lines, on the basis of the inversely transformed coordinates of the six points defined within the coverage of the camera 16b. It then applies a coordinate transformation similar to the "coordinate transformation" which took place at step G4A to the feature points picked up, followed by applying a rotation correction thereto which is similar to the "rotation correction of feature points" which took place at step G5A. Data of feature points which are obtained in this manner is written into the camera 16b taken data region of the lane region data table which is allocated to a particular area within the memory 15a. CPU's 21 and 31 perform a similar operation.

Subsequently, CPU 11 commands CPU 21 to effect a DMA transfer of feature points data processed in this manner to the memory 15a through the serial data communication line extending between CPU's. Upon completion of the DMA transfer, CPU 11 commands CPU 31 to effect DMA transfer of feature points data processed in this manner to the memory 15a. The detail of such DMA transfer is similar to DMA transfer which has been described above in connection with the "accumulation of correction data" which took place at step T3A.

H. "recognition of vehicle running ahead and determination of distance thereto" (step H)

A distribution of feature points is searched for among the lane region data table which is allocated to a particular area within the memory 15a, inclusive of the camera 16b taken data region, camera 26b taken data region and camera 36b taken data region. Specifically, as referenced to the road coordinate system having the projection of the fore-and-aft axis of the vehicle onto the horizontal plane as its Z-axis, a distribution in the X direction or lateral direction (Z-axis projection histogram) of feature points distributed over the lane on which the own vehicle is running, the right adjacent lane and the left adjacent lane is searched. In this instance, the road surface is scanned horizontally or in the X direction from left to right beginning from the downside or the side close to the vehicle in the Z-direction, and the number of feature points on the scan line is counted. The count is saved in a manner corresponding to the number of the scan line or Z-position. Such X scan is continued over the road surface in the Z direction from the downside to the upside or the far side.

When the formulation of the Z-axis projection histogram is completed, a horizontal scan line having a horizontal count or a number of feature points distributed in the X direction which exceeds a given value is seeked for. Where such horizontal scan line occur consecutively in the Z direction, the beginning Z position which is located closest to the vehicle and the end Z position of the consecutive width are determined, beginning from the downside, namely on the side closest to the vehicle, as viewed in the Z direction. When such consecutive cluster is encountered, feature points on the road surface distributed across the breadth of the cluster from the beginning position to the end position are scanned in the vertical or Z direction, beginning from the left end as viewed in the X direction. The scan is continued until the right end is reached. In this manner, a vertical distribution of feature points is determined, thus formulating an X axis projection histogram. Using the X axis projection histogram, a vertical scan line which exhibits a vertical count or a number of feature points as detected along the Z direction which exceeds a given value is picked out, and if such vertical scan lines occur consecutively in the X direction, the beginning X position and the end X position of this consecutive cluster are determined, starting from the left end as viewed in the X direction, or at a location corresponding to the left-hand white line of the left adjacent lane. When such cluster is encountered, a medium point is determined which has a coordinate Xt which is located at a median point between the beginning position and the end position. The breadth of the vertical scan is calculated to determine a medium point Zt of the consecutive cluster which occurs at a median point in the Z direction for horizontal scan lines having a count exceeding a given value. (Xt, Zt) is then written into a vehicle data table. When the search for a consecutive cluster of horizontal counts exceeding a given value which occur in the Z direction is terminated from as a reslt of search the left to the right end in respect to a first consecutive cluster of horizontal counts exceeding a given value which occur in the Z direction, a similar search is repeated for a second consecutive cluster of horizontal counts exceeding a given value which occur in the Z direction at a location further than the first Z direction cluster from the vehicle as viewed on the Z axis projection histogram.

In this manner, by utilizing the Z axis projection histogram, a region where another vehicle may exist, as viewed in the Z direction is sequentially searched beginning from the side closest to the own vehicle to the further side. When one such region is encountered, a similar search is conducted by a scan in the X direction from the left side of the own vehicle (left adjacent lane) to the right, thus searching for a region where another vehicle may exist. When such vehicle is found, data (Xt, Zt) representing the center of the searched region is written into the vehicle data table. When such search is completed over the entire road surface, it results that a position (Xt, Zt) in the road coordinate system of any vehicle, which may not be a vehicle, but an obstacle such as an article dropped by a truck, for example, which exists on the road surface, including the lane on which the own vehicle is running, and the estimated left adjacent lane and the estimated right adjacent lane, as taken by the cameras 16b, 26b and 36b, is contained in the vehicle data table.

Subsequently, CPU 11 distinguishes whether each position (Xt, Zt) contained in the vehicle data table is located on the left adjacent lane (which is estimated), across the left estimated lane and the lane on which the own vehicle is running, on the lane on which the own vehicle is running, across the own vehicle's lane and the right adjacent lane, or on the right adjacent lane (which is estimated), and data representing such discrimination is added to the position information (Xt, Zt) in the vehicle data table. Hereafter, position information (Xt, Zt)+discrimination data is referred to as "other vehicle data".

K. "output" (step K)

In the event of success of detection of a curvilinear line, CPU 11 transfers the curvature information (radius of curvature (RR+RL)/2) and "other vehicle data" from the vehicle data table to the host MPU 18 through the communication controller 17. In the event of a failure of a detection of a curvilinear line, it transfers rectilinear line information (data representing a rectilinear line) and "other vehicle data" from the vehicle data table.

A5. "calculation of camera steer angles" (step A5)

CPU 11 then determines a particular vehicle position which is located on the own vehicle's lane or across this lane and the left or right adjacent lane, as indicated by the discrimination data, which is in a range of distance Zt from 10 to 30 m and which is at the shortest distance, by utilizing "other vehicle data" from the vehicle data table. If such vehicle position is found, a steer angle A which is required to direct the centerline of the field of view of the camera 16b (or more precisely, its projection onto the road surface) to the particular vehicle position (Xt, Zt) is calculated. If such particular vehicle position is not found, a steer angle A which is required to direct the centerline of the view of the camera 16b (or its projection onto the road surface) to the center of the width WL located at Z position of L1, or at a distance of L1 forward of the own vehicle on the lane on which it is running, thus to a medium point between the left-hand and the right-hand white lines, is calculated. Data An stored in register An is written into register A, while the steer angle A which is now calculated is written into register An.

Subsequently, CPU 11 determines a particular vehicle position which is located on the own vehicle's lane, or across it and the left or right adjacent lane, as indicated by the discrimination data, and in a range of distance Zt from 30 to 60 m and which is located at the shortest distance, by utilizing "other vehicle data" from the vehicle data table. If such particular vehicle position is found, a steer angle B which is required to direct the centerline of the view of the camera 26b (or its projection onto the road surface) to the particular vehicle position (Xt, Zt) is calculated. In the event such vehicle position is not found, a steer angle B which is required to direct the centerline of the field of view of the camera 26b (or its projection onto the road surface) to the center of the own vehicle's lane across the width WL, or at medium point between the left- and right-hand white lines, which is located at Z position equal to L2, or at a distance of L2 forward of the own vehicle is calculated. Data Bn stored in register Bn is written into register B while the steer angle B which is now calculated is written into register Bn.

Subsequently, CPU 11 determines a particular vehicle position which is located on the own vehicle's lane or across it and a left or right adjacent lane, as indicated by the discrimination data, in a range of distance Zt from 60 to 90 m and which is at the shortest distance, by utilizing "other vehicle data" from the vehicle data table. If such particular vehicle position is found, a steer angle C which is required to direct the centerline of the field of view of the camera 36b (or its projection onto the road surface) to the particular vehicle position (Xt, Zt) is calculated. If such particular vehicle position is not found, a steer angle C which is required to direct the centerline of the field of view of the camera 36b (or its projection onto the road surface) to the center of the own vehicle's lane across the width WL, or at a medium point between left- and right-hand white lines, which is located at Z position equal to L3, or at a distance of L3 forward of the own vehicle, is calculated. Data Cn stored in register Cn is written into register C while the steer angle C which is now calculated is written into the register Cn.

T5. "transmission of camera steer angles" (step T5)

Utilizing the serial data communication line extending between CPU's, CPU 11 transmits data Bn stored in register Bn to CPU 21, and transmits data Cn stored in register Cn to CPU 31.

CPU's 11, 21 and 31 apply data An, Bn and Cn to the steering controllers 16e, 26e and 36e, respectively, during the "camera steering" which take place at step A1, allowing these controllers to drive the individual cameras rotatively so that the centerline of field of view of the cameras 16b, 26b and 36b (or their projection onto the horizontal plane) form angles An, Bn and Cn with respect to the fore-and-aft axis of the vehicle (or its projection onto the horizontal plane). In this manner, whenever there is a vehicle running ahead, the camera is capable of tracking such vehicle. In the event a vehicle running ahead is not found, the camera tracks the center across the width of the own vehicle's lane.

Upon completion of "transmission of camera steer angles" which take place at step T5, CPU 11 proceeds to "command an image input" (step T1) shown in FIG. 9. Subsequently, the described operation is repeated.

While a preferred embodiment of the invention has been shown and described above, a number of change and modifications are possible therein. Accordingly, it is not intended that the invention be limited to the specific construction or arrangement disclosed herein, but that the right is reserved to all changes and modifications coming within the scope of invention defined by the appended claims.

What is claimed is:

1. An apparatus for detecting an object located ahead of a vehicle comprising:

a first camera means for taking a picture of a first scene of a wide view angle inclusive of a road surface located at a near distance forward of the vehicle;

a second camera means for taking a picture of a second scene of narrow view angle inclusive of a road surface located at a far distance forward of the vehicle;

means for detecting an object located forward of the vehicle on the road surface contained in at least one of the first and second scenes on the basis of image data which forms a picture screen of the first and second scene;

first camera direction control means for altering the direction of the first camera transverse to the fore-and-aft axis of the vehicle in a direction such that a substantially full profile of the object located forward of the vehicle and detected in the first scene is contained in the first scene; and second camera direction control means for altering the direction of the second camera transverse to the fore-and-aft axis of the vehicle in a direction such that a substantially full profile of the object located forward of the vehicle and detected in the second scene is contained in the second scene.

2. An apparatus according to claim 1 in which the first camera direction control means alters the first angle in a direction to bring the substantial center of the object located forward of the vehicle and detected in the first scene to the center of the first scene, and the second camera direction control means alters the second angle in a direction to bring the substantial center of the object located forward of the vehicle and detected in the second scene to the center of the second scene.

3. An apparatus according to claim 2 in which the fis camera means and the second camera means take a picture of white lines located at the left and right end of a lane on which the vehicle is running, the first and the second camera direction control means altering the first and the second angle in a direction to bring a median point between white lines at the left and the right end in each of the first and second scene to the center of each scene.

4. An apparatus according to claim 2 in which the object located forward of the vehicle includes a vehicle running ahead of the first mentioned vehicle, the first and the second camera direction control means altering the first and the second angle in a direction to bring the center position of the vehicle located ahead in each of the first and second scene to the center of each scene.

5. An apparatus according to claim 2 in which said means for detecting an object also detects white lines located at the left and the right end of a lane on which the vehicle is running and detects the presence or absence of any vehicle located forward of the first mentioned vehicle intermediate the detected white lines, the first and the sec camera direction control means altering the first and the second angle in a direction to bring a median point between the detected white lines to the center of each scene whenever any vehicle running ahead is not detected in either the first or second scene, the first and the second camera direction control means being responsive to the detection of a vehicle running ahead by said means for detecting an object to alter the first angle in a direction to bring the detected vehicle to the center of the first scene when the detected vehicle is located in the first scene, the second camera direction control means being responsive to the detection of a vehicle running ahead by said means for detecting an object to alter the second angle in a direction to bring the detected vehicle to the center of the second scene when the detected vehicle is located in the second scene.

6. An apparatus according to claim 1 in which the first camera means includes a first television camera of wide view angle which takes a picture of a road surface located at a near distance forward of the vehicle an a first rotary drive unit for rotatively driving the camera in order to alter the direction of the first television camera transverse to the fore-and-aft axis of the vehicle, and the second camera means includes a second television camera of a narrow view angle which takes a picture of a road surface located at a far distance forward of the vehicle and a second rotary drive unit for rotatively driving the camera in order to alter the direction of the second television camera transverse to the fore-and-aft axis of the vehicle, said means for detecting an object being operable to detect an object located forward of the vehicle as the object appears on the road surface in a picture screen formed by the first and the second television camera, on the basis of image data which forms such picture screen.

7. An apparatus according to claim 6 in which the firs camera direction control means alters the direction of the first television camera through the first rotary drive unit in a direction to bring the substantial center of the object located forward of the vehicle and detected on the picture screen formed by the first television camera to the center of the screen, and the second camera direction control means alters the direction of the second television through the second rotary drive unit in a direction to bring the substantial center of the object located forward of the vehicle and detected on the picture screen formed by the second television camera to the center of the screen.

8. An apparatus according to claim 7 in which said means for detecting an object detects white lines located at the left and the right end of a lane on which the vehicle is running at it appears on the road surface in the screen, based on image data from the first and the second television camera which form a picture screen, and calculates a typical one left end line representative of both white lines at the left end of the picture screens produced by the first and the second television cameras and a typical one right end line representative of white lines at the right end in the picture screens produced by the first and the second television cameras, thus detecting the presence or absence of a vehicle running ahead in a region sandwiched between the left end and the right end line.

9. An apparatus according to claim 8 in which the first and the second camera direction control means alters the direction of the first and the second television camera through the first and second rotary drive unit respectively, respectively in a direction such that a median line between the left end and the right end line is brought to the center of the respective picture screens produced by the first and the second television cameras when said means for detecting an object does not detect a vehicle running ahead in a region sandwiched between the left end and the right end line, and is also responsive to the detection by said means for detecting an object of a vehicle running ahead to alter the direction of the first television camera through the first rotary drive unit in a direction to bring the vehicle running ahead which is detected to the center of the picture screen produced by the first television camera when the vehicle detected lies in a region of the picture screen produced by the first television camera which is sandwiched between the left end and the right end line, and to alter the direction of the second television camera through the second rotary drive unit in a direction to bring the vehicle running ahead which is detected to the center of the picture screen produced by the second television camera when the detected vehicle lies in a region of the picture screen produced by the second television camera which is sandwiched between the left end and the right end line.

10. An apparatus for detecting an object located ahead of a vehicle comprising:

a first television camera of wide view angle which takes a picture of a road surface located at a near distance forward of the vehicle;

a first rotary drive unit for rotatively driving the camera to alter the direction of the first television camera transverse to the fore-and-aft axis of the vehicle;

a second television camera of a medium view angle which takes a picture of a road surface located at a medium distance forward of the vehicle;

a second rotary drive unit for rotatively driving the camera to alter the direction of the second television camera transverse to the fore-and-aft axis of the vehicle;

a third television camera of a narrow view angle which takes a picture of a road surface located at a far distance forward of the vehicle;

a third rotary drive unit for rotatively driving the camera to alter the direction of the third television camera transverse to the fore-and-aft axis of the vehicle;

means for detecting an object located forward of the vehicle as it appears on a road surface in the picture screen of each camera, based on image data from the first, the second and the third television cameras, each of which produce a picture screen;

and camera direction control means for altering the direction of the first television camera, through the first rotary drive unit, in a direction to bring the object located forward of the vehicle and detected on the picture screen produced by the first television camera to the center of the picture screen, for altering the direction of the second television camera, through the second rotary drive unit, in a direction to bring the object located forward of the vehicle and detected on the picture screen produced by the second television camera to the center of the picture screen, and for altering the direction of the third television camera, through the third rotary drive unit, in a direction to bring the object located forward of the vehicle which is detected on the picture screen produced by the third television camera to the center of the picture screen.

11. An apparatus according to claim 10 in which the camera direction control means alters the direction of the first television camera, through the first rotary drive unit, in a direction to bring a substantial center of the object located forward of the vehicle and detected on the picture screen produced by the first television camera to the center of the picture screen, alters the direction of the second television camera, through the second rotary drive unit, in a direction to bring a substantial center of the object located forward of the vehicle which is detected on the picture screen produced by the second television camera to the center of the picture screen, and alters the direction of the third television camera, through the third rotary drive unit, in a direction to bring a substantial center of the object located forward of a vehicle which is detected on the picture screen produced by the third television camera to the center of the picture screen.

12. An apparatus according to claim 11 in which said means for detecting an object detects white lines located at the left and right ends of a lane on which the vehicle is running as the lines appear on the road surface in a picture screen, based on image data from the first, the second and the third television cameras, each of which produce a picture screen, and calculates one left end line which is representative of three white lines located at the left end of the lane on picture screens produced by the first, the second and third television cameras and one right end line which is representative of three white lines located at the right end, thereby detecting the presence or absence of a vehicle running ahead in a region which is sandwiched between the left end and the right end line.

13. An apparatus according to claim 12 in which the camera direction control means alters the direction of the first, the second and the third television cameras through the first, the second and the third rotary drive unit, respectively, in a direction to bring a median line between the left end and the right end line to the center of the picture screen produced by the first, the second and the third television cameras whenever said means for detecting an object does not detect a vehicle running ahead in a region sandwiched between the left end and the right end line, and also responsive to the detection by said means for detecting an object of the presence of a vehicle running ahead to alter the direction of the first television camera through the first rotary drive unit in a direction to bring the detected vehicle running ahead to the center of the picture screen produced by the first television camera when the detected vehicle lies in a region on the picture screen produced by the first television camera which is sandwiched between the left end and the right end line, to alter the direction of the second television camera through the second rotary drive unit in a direction to bring the detected vehicle running ahead to the center of the picture screen produced by the second television camera when the detected vehicle lies in a region on the picture screen produced by the second television camera which is sandwiched between the left end and the right end line, and to alter the direction of the third television camera through the third rotary drive unit a direction to bring the detected vehicle running ahead to the center of the picture screen produced by the third televison camera when the detected vehicle lies in a region on the picture screen produced by the third television camera which is sandwiched between the left end and the right end line.

* * * * *